US011527075B2

(12) United States Patent
Takahashi et al.

(10) Patent No.: US 11,527,075 B2
(45) Date of Patent: Dec. 13, 2022

(54) INFORMATION PROCESSING APPARATUS, IMAGING APPARATUS, APPARATUS CONTROL SYSTEM, MOVABLE OBJECT, INFORMATION PROCESSING METHOD, AND COMPUTER-READABLE RECORDING MEDIUM

(71) Applicant: Ricoh Company, Ltd., Tokyo (JP)

(72) Inventors: Sadao Takahashi, Kanagawa (JP); Daisuke Okada, Kanagawa (JP); Sukehiro Kimura, Kanagawa (JP); Tabito Suzuki, Tokyo (JP); Yohichiroh Ohbayashi, Kanagawa (JP); Hiroki Kubozono, Kanagawa (JP); Jun Yoshida, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 54 days.

(21) Appl. No.: 16/347,611

(22) PCT Filed: Nov. 28, 2017

(86) PCT No.: PCT/JP2017/042693
§ 371 (c)(1),
(2) Date: May 6, 2019

(87) PCT Pub. No.: WO2018/097331
PCT Pub. Date: May 31, 2018

(65) Prior Publication Data
US 2019/0347496 A1 Nov. 14, 2019

(30) Foreign Application Priority Data
Nov. 28, 2016 (JP) .............................. JP2016-230256
Sep. 14, 2017 (JP) .............................. JP2017-176720

(51) Int. Cl.
*G06V 20/58* (2022.01)
*G06T 7/593* (2017.01)
(Continued)

(52) U.S. Cl.
CPC .............. *G06V 20/58* (2022.01); *G01B 11/24* (2013.01); *G06T 7/593* (2017.01); *G06V 10/225* (2022.01);
(Continued)

(58) Field of Classification Search
CPC ........... G06K 9/00805; G06K 9/00228; G06K 9/2063; G06K 9/3241; G06K 9/4647;
(Continued)

(56) References Cited

U.S. PATENT DOCUMENTS

2003/0210807 A1* 11/2003 Sato ....................... G08G 1/165
382/104
2004/0035935 A1 2/2004 Takahashi et al.
(Continued)

FOREIGN PATENT DOCUMENTS

EP 2 645 136 A1 10/2013
JP H11-120480 A 4/1999
(Continued)

OTHER PUBLICATIONS

International Search Report and Written Opinion dated Feb. 15, 2018 in PCT/JP2017/042693 filed on Nov. 28, 2017.
(Continued)

*Primary Examiner* — Amandeep Saini
(74) *Attorney, Agent, or Firm* — Xsensus LLP

(57) ABSTRACT

According to an aspect of the present invention, an information processing apparatus includes an object region detecting unit, a local region detecting unit, an object specifying unit. The object region detecting unit is configured to detect an object region based on one of distance
(Continued)

information and luminance information. The local region detecting unit is configured to, when a divided area obtained by dividing the detected object region meets a predetermined condition, detect the divided area as a local region. The object specifying unit is configured to specify, as a specification target object, the object region in which the local region is continuously detected.

11 Claims, 20 Drawing Sheets

(51) Int. Cl.
    *G01B 11/24*     (2006.01)
    *G06V 10/22*     (2022.01)
    *G06V 10/20*     (2022.01)
    *G06V 40/16*     (2022.01)

(52) U.S. Cl.
    CPC .......... *G06V 10/255* (2022.01); *G06V 40/161* (2022.01); *G06T 2207/10152* (2013.01)

(58) Field of Classification Search
    CPC .......... G06T 7/593; G06T 2207/10152; G01B 11/24; G06V 20/58; G06V 10/225; G06V 10/255; G06V 40/161; G06V 10/507
    USPC ........................................................ 382/103
    See application file for complete search history.

(56) References Cited

U.S. PATENT DOCUMENTS

| | | |
|---|---|---|
| 2005/0271294 A1 | 12/2005 | Takahashi |
| 2006/0049260 A1 | 3/2006 | Takahashi et al. |
| 2007/0076984 A1 | 4/2007 | Takahashi et al. |
| 2012/0162415 A1* | 6/2012 | Wu .......................... H04N 7/18 348/142 |
| 2012/0242835 A1 | 9/2012 | Li et al. |
| 2013/0260096 A1 | 10/2013 | Shiki et al. |
| 2013/0261950 A1 | 10/2013 | Sasabuchi et al. |
| 2015/0203035 A1* | 7/2015 | Watanabe .......... B62D 15/0295 382/103 |
| 2015/0243017 A1 | 8/2015 | Fujimoto et al. |
| 2015/0294160 A1 | 10/2015 | Takahashi et al. |
| 2015/0332103 A1 | 11/2015 | Yokota et al. |
| 2016/0019429 A1 | 1/2016 | Ishigaki et al. |
| 2016/0189547 A1* | 6/2016 | Hsu ........................... B60T 7/22 701/70 |
| 2017/0295610 A1* | 10/2017 | Usami ...................... H05B 3/84 |
| 2018/0300562 A1 | 10/2018 | Yamada et al. |
| 2019/0005691 A1 | 1/2019 | Takahashi et al. |
| 2019/0065859 A1* | 2/2019 | Togashi .................. G06T 7/215 |

FOREIGN PATENT DOCUMENTS

| | | |
|---|---|---|
| JP | 2004-7246 A | 1/2004 |
| JP | 2006-101384 A | 4/2006 |
| JP | 2008-65634 A | 3/2008 |
| JP | 2011-113330 A | 6/2011 |
| JP | 2013-148971 A | 8/2013 |
| JP | 2013-228987 A | 11/2013 |
| JP | 2015-156074 A | 8/2015 |
| JP | 2016-18538 A | 2/2016 |
| WO | WO 2017/115732 A1 | 7/2017 |
| WO | WO 2017/159082 A1 | 9/2017 |

OTHER PUBLICATIONS

Office Action dated Sep. 7, 2021 in Japanese Patent Application No. 2017-176720, 5 pages.

Office Action dated Nov. 24, 2021 in Japanese Patent Application No. 2017-176720, 14 pages.

\* cited by examiner

[Fig. 1]
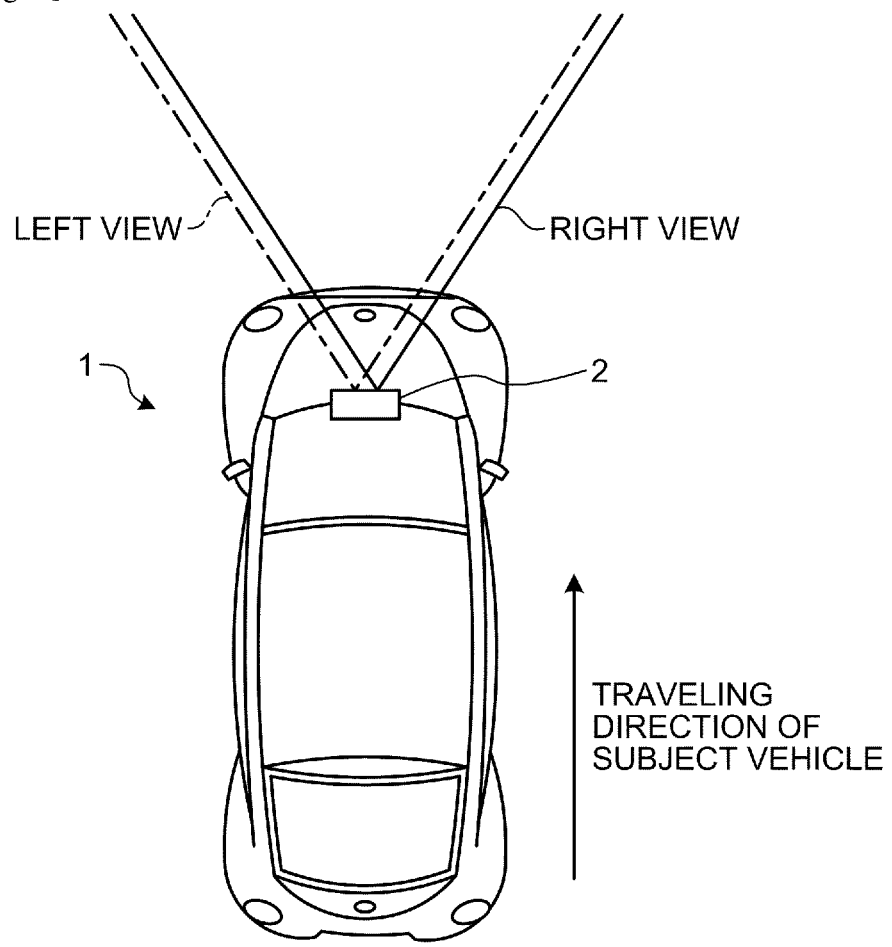
[Fig. 2]
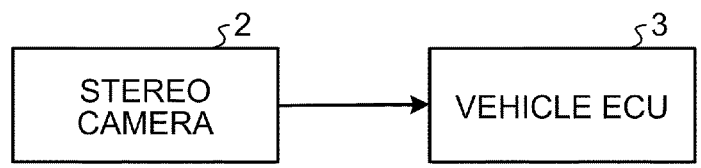

[Fig. 3]
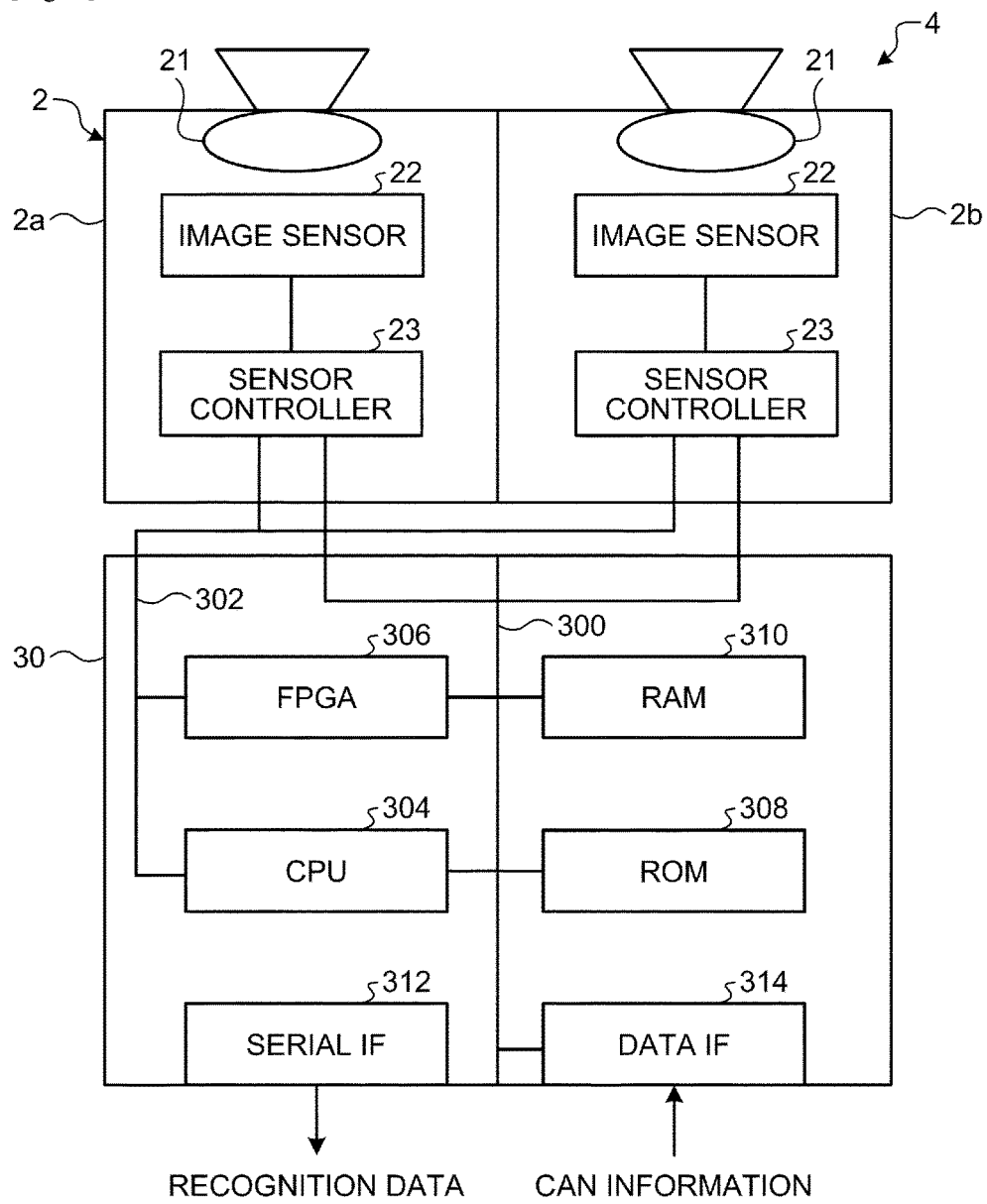
RECOGNITION DATA    CAN INFORMATION
[Fig. 4]
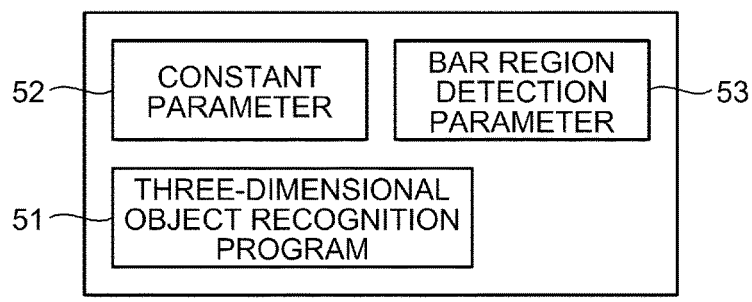
[Fig. 5]
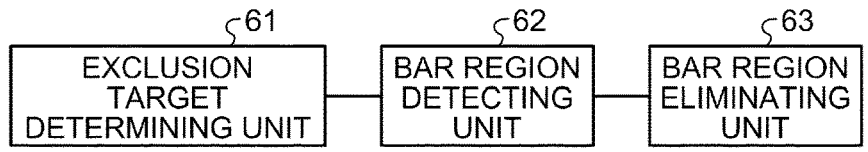

[Fig. 6]
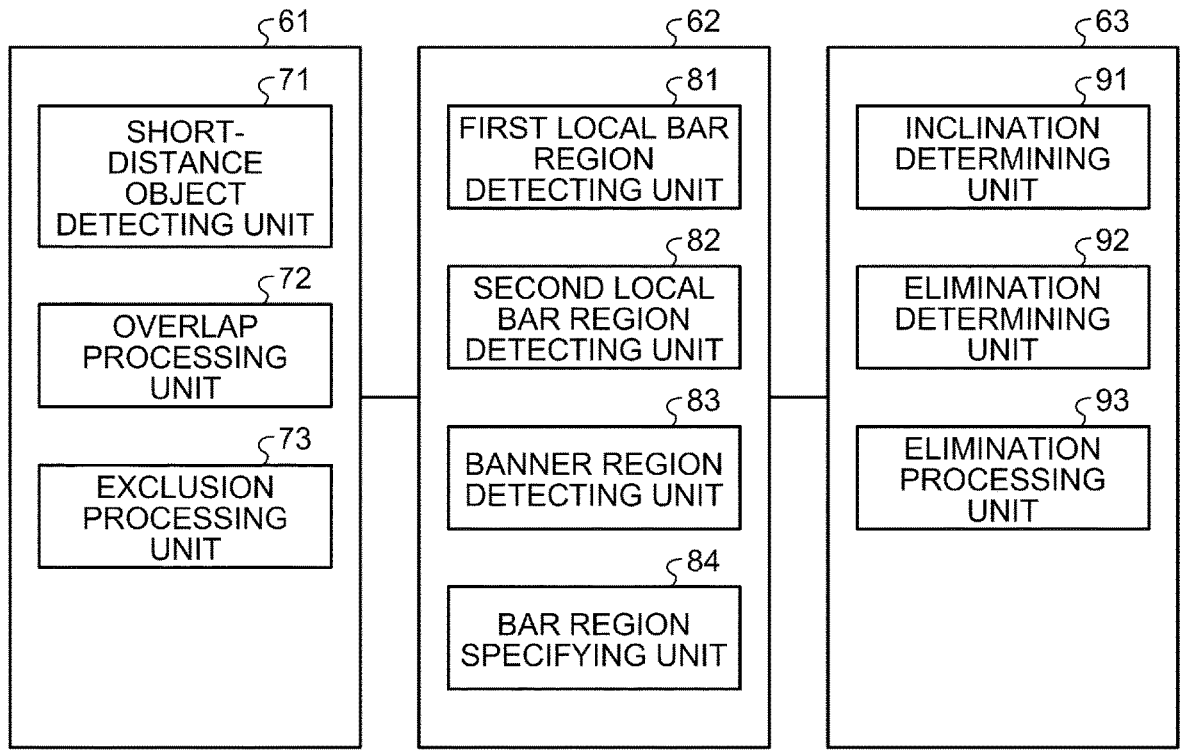
[Fig. 7]
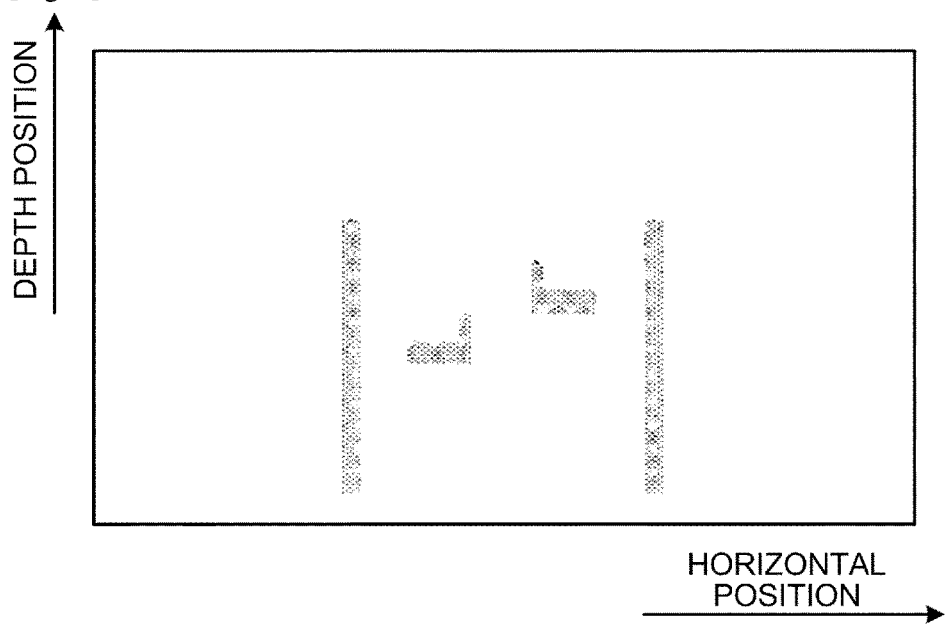

[Fig. 9]
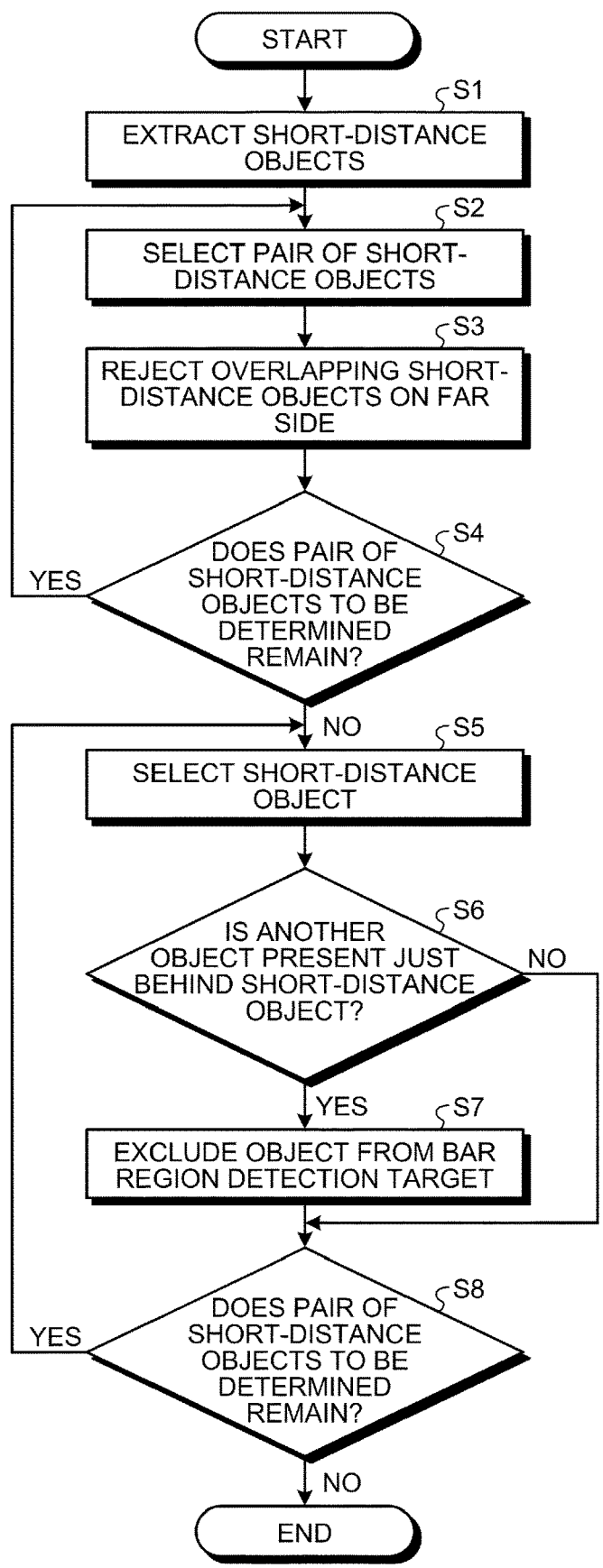

[Fig. 10]
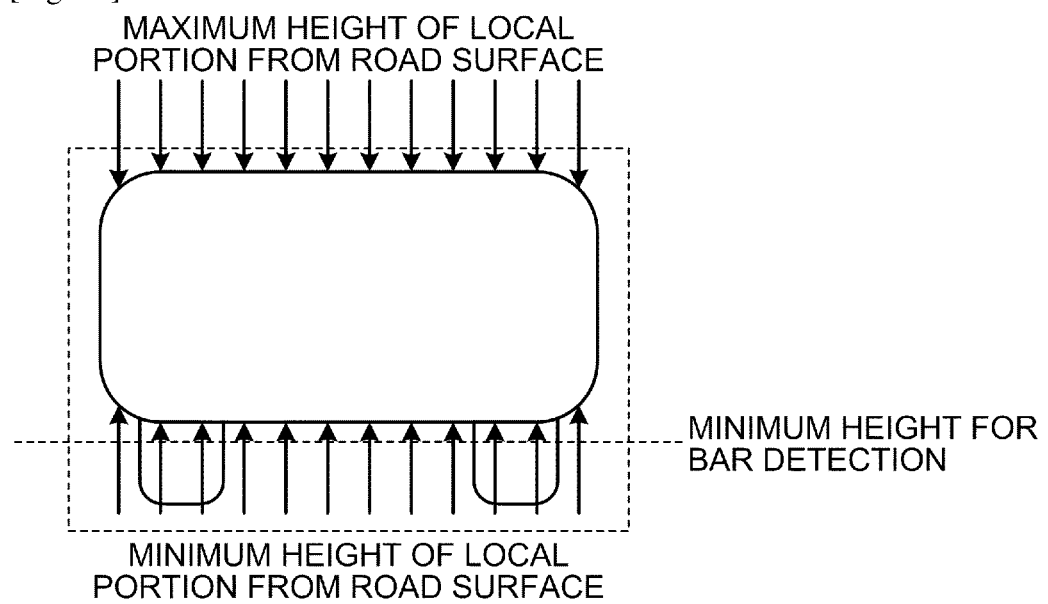

[Fig. 11]
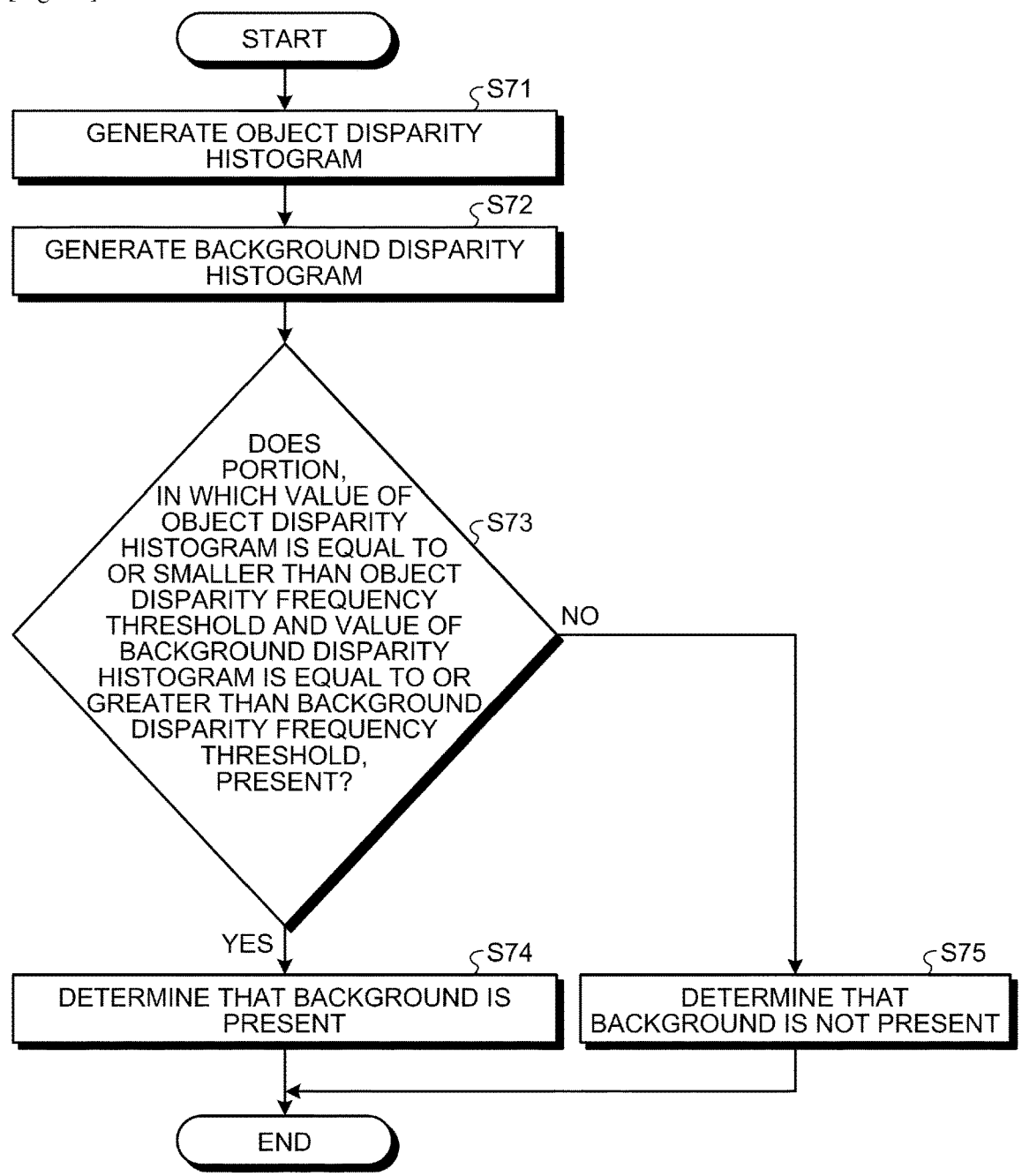
[Fig. 12A]
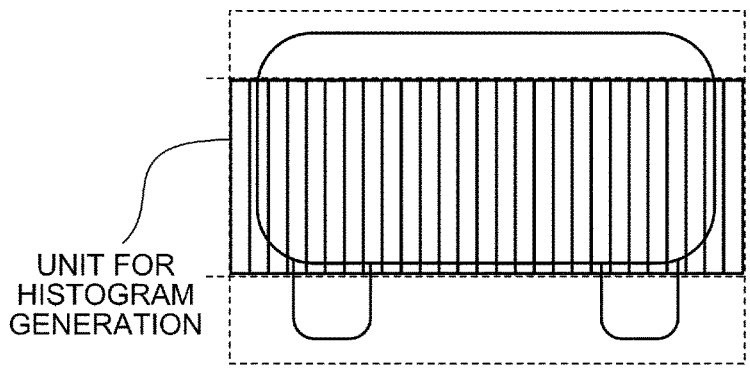

[Fig. 12B]
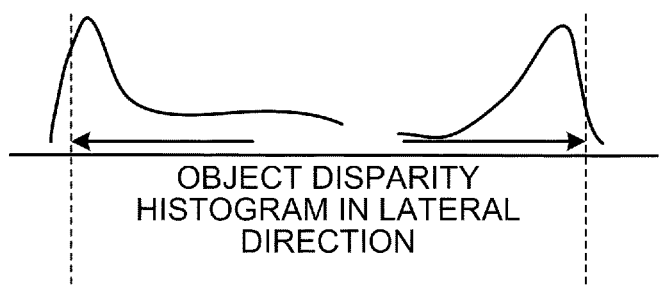
OBJECT DISPARITY HISTOGRAM IN LATERAL DIRECTION
[Fig. 12C]
BACKGROUND DISPARITY HISTOGRAM IN LATERAL DIRECTION

[Fig. 13]
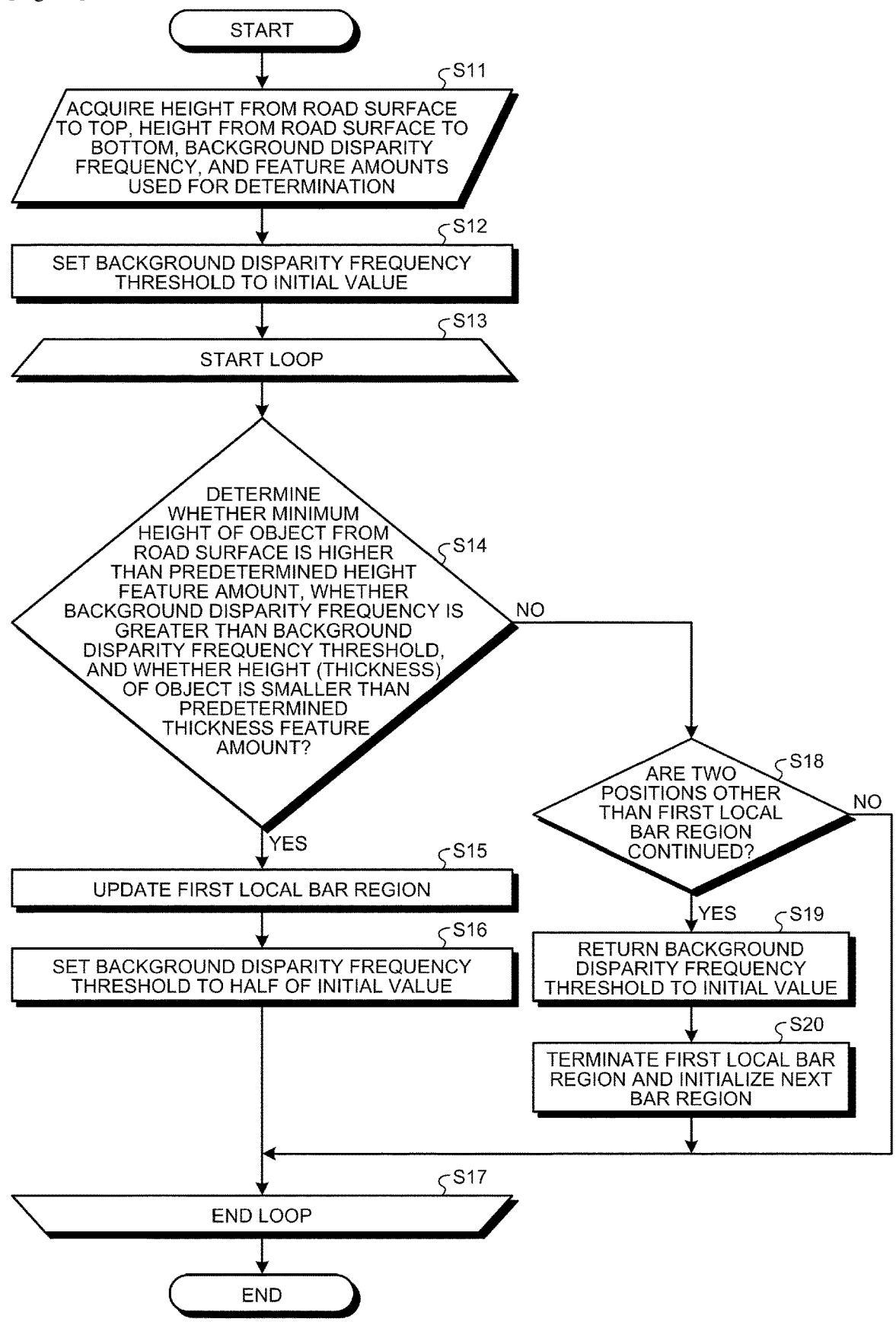

[Fig. 21B]
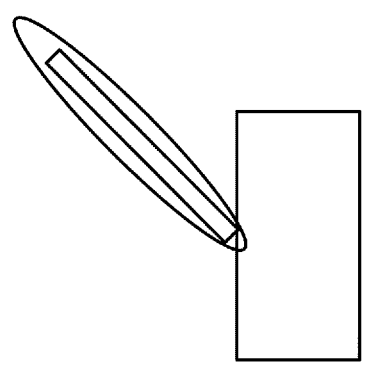

INFORMATION PROCESSING APPARATUS, IMAGING APPARATUS, APPARATUS CONTROL SYSTEM, MOVABLE OBJECT, INFORMATION PROCESSING METHOD, AND COMPUTER-READABLE RECORDING MEDIUM

TECHNICAL FIELD

The present invention relates to an information processing apparatus, an imaging apparatus, an apparatus control system, a movable object, an information processing method, and a computer-readable recording medium.

BACKGROUND ART

Conventionally, automotive body structures or the like have been developed from a viewpoint of safety of automobiles, such as a viewpoint of how to save a pedestrian and protect an occupant in the case of collision with a pedestrian, an automobile, or the like. In recent years, with the advancement of an information processing technology and an image processing technique, a technique to detect a person, an automobile, or the like at a high speed is being developed. With use of the techniques as described above, there is a known automobile including a collision avoidance system that prevents an occurrence of collision by automatically putting a brake before collision. The collision avoidance system measures a distance to a person, another vehicle, or the like by using a millimeter wave radar device, a laser radar device, a stereo camera device, or the like, and performs brake control based on the measured distance. With this configuration, it is possible to automatically put a brake in accordance with a distance to a person, another vehicle, or the like.

Patent Literature 1 (Japanese Unexamined Patent Application Publication No. 2013-228987) discloses a railroad crossing gate estimation apparatus. The railroad crossing gate estimation apparatus estimates, as a railroad crossing gate, at least one of external objects such as an external object with a lateral width that increases with a lapse of time and an external object with a predetermined length at a specific height from the ground. With this configuration, it is possible to easily estimate the presence of a railroad crossing gate.

SUMMARY OF INVENTION

Technical Problem

However, if the collision avoidance system detects, as a normal three-dimensional object, an object such as a bar at an electronic toll collection (ETC) gate installed on an expressway, a toll road, or the like, or a bar at a railroad crossing gate, the following inconvenience occurs. That is, the collision avoidance system sounds an alarm when a vehicle approaches a bar at an ETC gate or a railroad crossing gate, and makes a driver feel discomfort. Therefore, while an object such as a bar at an ETC gate or a railroad crossing gate is an obstacle for a vehicle, it is preferable to accurately detect the object and exclude the object from a detection target object of the collision avoidance system.

The present invention has an object to provide an information processing apparatus, an imaging apparatus, an apparatus control system, a movable object, an information processing method, and a computer-readable recording medium that are capable of accurately detecting an object.

Solution to Problem

According to an aspect of the present invention, an information processing apparatus includes an object region detecting unit, a local region detecting unit, an object specifying unit. The object region detecting unit is configured to detect an object region based on one of distance information and luminance information. The local region detecting unit is configured to, when a divided area obtained by dividing the detected object region meets a predetermined condition, detect the divided area as a local region. The object specifying unit is configured to specify, as a specification target object, the object region in which the local region is continuously detected.

Advantageous Effects of Invention

According to an embodiment of the present invention, it is possible to accurately detect an object.

BRIEF DESCRIPTION OF DRAWINGS

FIG. 1 is a diagram illustrating a position of a stereo camera provided in a vehicle that is an apparatus control system according to an embodiment.

FIG. 2 is a diagram illustrating configurations of the stereo camera included in the vehicle, and the periphery of the stereo camera.

FIG. 3 is a diagram illustrating a configuration example of an imaging apparatus including the stereo camera.

FIG. 4 is a diagram illustrating a software configuration of the apparatus control system according to the embodiment.

FIG. 5 is a functional block diagram of functions implemented by causing a CPU of an image processing apparatus to execute a three-dimensional object recognition program.

FIG. 6 is a functional block diagram of detailed functions implemented by causing the CPU of the image processing apparatus to execute the three-dimensional object recognition program.

FIG. 7 is a diagram illustrating an example of a mapping image.

FIG. 9 is a flowchart for explaining an operation performed by an exclusion target determining unit to detect an object to be a bar-shaped object detection candidate from the mapping image.

FIG. 10 is a diagram for explaining a basic feature amount used for a bar-shaped object detection process.

FIG. 11 is a flowchart illustrating the flow of a background disparity detection operation.

FIG. 12A is a schematic diagram illustrating a region as a bar-shaped object detection candidate.

FIG. 12B is an object disparity histogram.

FIG. 12C is a background disparity histogram.

FIG. 13 is a flowchart illustrating the flow of a first local bar region detection process.

FIG. 21B is a diagram for explaining an operation of determining whether to use an object as a detection target for a bar-shaped object depending on inclination of the object.

DESCRIPTION OF EMBODIMENTS

Figure 8:
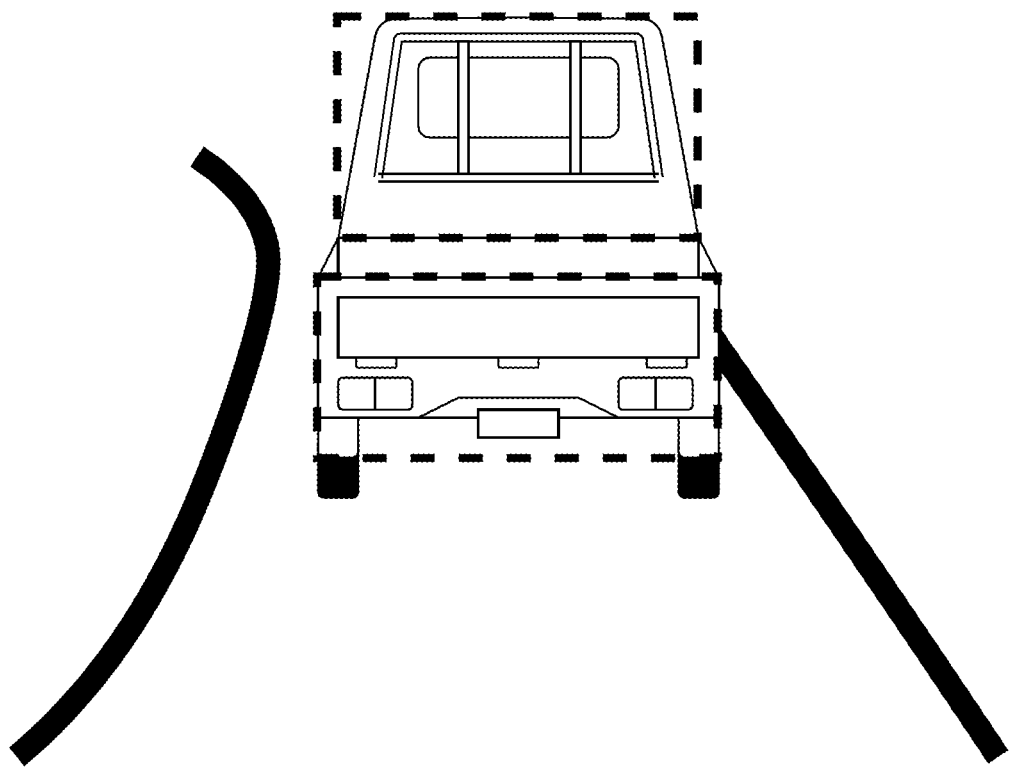
FIG. 8 is a diagram illustrating an example of an object detection result.

Embodiments of an apparatus control system will be described below with reference to the drawings.

System Configuration

As illustrated in FIG. 1, an apparatus control system according to an embodiment is provided on a windshield or the like of a vehicle 1, and includes a stereo camera 2 that captures an image in a predetermined imaging range on the front side in a traveling direction. The stereo camera 2 is an imaging unit that includes two image sensors 22 and captures two images of a left view and a right view as will be described later with reference to FIG. 3.

FIG. 2 is a diagram illustrating configuration examples of the stereo camera 2 included in the vehicle 1 that is one example of a movable object, and the periphery of the stereo camera. The stereo camera 2 outputs two captured images to a vehicle engine control unit (ECU) 3, for example. The vehicle ECU 3 is installed in the vehicle 1, and performs control for the vehicle 1, such as engine control, brake control, driving lane keep assist, or steering assist for the vehicle 1. The vehicle ECU 3 is one example of a control unit. While a vehicle as one example of a movable object will be described below, the apparatus control system according to the embodiment is also applicable to a ship, an airplane, a robot, or the like.

Configuration of Imaging Apparatus

FIG. 3 is a diagram illustrating a configuration example of an imaging apparatus 4 including the stereo camera 2. The imaging apparatus 4 includes, for example, the stereo camera 2 and an image processing apparatus 30. The stereo camera 2 includes a camera unit 2a serving as a left eye and a camera unit 2b serving as a right eye, which are assembled parallel (horizontally) to each other, and captures a moving image (or a still image) of an imaging target region.

Each of the camera units 2a and 2b includes a lens 21, the image sensor 22, and a sensor controller 23. The image sensor 22 is, for example, a charge coupled device (CCD) image sensor or a complementary metal-oxide semiconductor (CMOS) image sensor. The sensor controller 23 performs exposure control, image readout control, communication with external circuits, image data transmission control, and the like with respect to the image sensor 22, for example.

The image processing apparatus 30 is provided inside the vehicle ECU 3 illustrated in FIG. 2, for example. The image processing apparatus 30 includes, for example, a data bus line 300, a serial bus line 302, a central processing unit (CPU) 304, a field-programmable gate array (FPGA) 306, a read only memory (ROM) 308, a random access memory (RAM) 310, a serial interface (IF) 312, and a data IF 314.

The above-described stereo camera 2 is connected to the image processing apparatus 30 via the data bus line 300 and the serial bus line 302. The CPU 304 controls entire operations of the image processing apparatus 30, and executes image processing and image recognition processing. Luminance image data of a captured image captured by the image sensor 22 of each of the camera units 2a and 2b is written to the RAM 310 of the image processing apparatus 30 via the data bus line 300. Control data for changing a sensor exposure value, control data for changing an image readout parameter, various kinds of setting data, and the like provided from the CPU 304 or the FPGA 306 are transmitted and received via the serial bus line 302.

The FPGA 306 generates a disparity image by performing a process required to be executed in real time, such as gamma correction, distortion correction (parallelization of a left image and a right image), or disparity calculation by block matching, on image data stored in the RAM 310, and writes the disparity image to the RAM 310 again. The CPU 304 controls each of the sensor controllers 23 of the stereo camera 2 and the entire image processing apparatus 30. The CPU 304 acquires, for example, controller area network (CAN) information on a subject vehicle, as a parameter (a vehicle speed, acceleration, a steering angle, a yaw rate, or the like), via the data IF 314.

Detection data (recognition data) of a detection target (recognition target) is provided to the vehicle ECU 3 via the serial IF 312, and used in an automatic braking system, a drive assist system, or the like that is provided as a control function of the vehicle ECU 3, for example. The automatic braking system performs brake control on the vehicle 1. The drive assist system performs driving lane keep assist, steering assist, or the like on the vehicle 1.

Software Provided in Image Processing Apparatus

FIG. 4 illustrates software provided in the image processing apparatus 30. As illustrated in FIG. 4, the image processing apparatus 30 is provided with a constant parameter 52, a bar region detection parameter 53, and a three-dimensional object recognition program 51. A storage location of each software is stored in a storage unit, such as the ROM 308 or the RAM 310. The constant parameter 52 is a parameter used for determining a bar region detection exclusion target. The bar region detection parameter 53 is a parameter used for detecting a bar region. The three-dimensional object recognition program 51 is a program for performing situation recognition, prediction, object recognition, or the like.

The CPU 304 performs various kinds of processing, such as situation recognition, by using luminance image data and disparity image data stored in the RAM 310 in accordance with the three-dimensional object recognition program 51, and detects (recognizes) a detection target, such as a vehicle ahead, for example. The CPU 304 also performs an image data rejection process. The CPU 304 also performs a bar-shaped object detection process, which will be described later, in accordance with the three-dimensional object recognition program 51. In the present embodiment, explanation will be given that a bar-shaped object is used as a detection target; however, this is merely one example. An object detection method of the present embodiment described below can be applied to objects other than the bar-shaped object, and can detect objects in a preferred manner.

Functions of Three-Dimensional Object Recognition Program

FIG. 5 illustrates functional blocks of functions implemented by causing the CPU 304 to execute the three-dimensional object recognition program 51. As illustrated in FIG. 5, the CPU 304 implements functions of an exclusion target determining unit 61, a bar region detecting unit 62, and a bar region eliminating unit 63 by executing the three-dimensional object recognition program 51.

FIG. 6 illustrates detailed functions of the exclusion target determining unit 61, the bar region detecting unit 62, and the bar region eliminating unit 63. As illustrated in FIG. 6, the exclusion target determining unit 61 includes a short-distance object detecting unit 71, an overlap processing unit 72, and an exclusion processing unit 73. The bar region detecting unit 62 includes a first local bar region detecting unit 81, a second local bar region detecting unit 82, a banner region detecting unit 83, and a bar region specifying unit 84. The bar region eliminating unit 63 includes an inclination determining unit 91, an elimination determining unit 92, and an elimination processing unit 93. The short-distance object detecting unit 71 is one example of an object region detecting unit. The first local bar region detecting unit 81 is one example of a first local region detecting unit. The second local bar region detecting unit 82 is one example of a second local region detecting unit. The bar region specifying unit 84 is one example of an object specifying unit. The exclusion processing unit 73 is one example of an excluding unit. The elimination processing unit 93 is one example of an eliminating unit.

In this example, the exclusion target determining unit 61 to the bar region eliminating unit 63 are implemented by software; however, a part or all of the exclusion target determining unit 61 to the bar region eliminating unit 63 may be implemented by hardware, such as an integrated circuit (IC).

The three-dimensional object recognition program 51 may be provided by being recorded in a computer-readable recording medium, such as a compact disc ROM (CD-ROM) or a flexible disk (FD), in a computer-installable or computer-executable file format. Furthermore, the three-dimensional object recognition program 51 may be provided by being recorded in a computer-readable recording medium, such as a CD recordable (CD-R), a digital versatile disk (DVD), a Blu-ray disc (registered trademark), or a semiconductor memory. Moreover, the three-dimensional object recognition program 51 may be provided by being installed via a network, such as the Internet. Furthermore, the three-dimensional object recognition program 51 may be provided by being incorporated in a ROM or the like in the apparatus in advance.

Operations in Embodiment

The apparatus control system according to the embodiment generates a disparity image, in which a vertical position, a lateral position, and a depth position are associated with one another, from captured images captured by the stereo camera 2. Furthermore, the apparatus control system according to the embodiment generates a mapping image (a bird's view image or a look-down view image), in which the lateral position and the depth position are associated with each other, based on the disparity image. FIG. 7 illustrates one example of the mapping image. The apparatus control system according to the embodiment detects object regions to be detection candidates for a bar-shaped object on the mapping image, and determines whether the object regions serving as the detection candidates correspond to the bar-shaped object. Then, the apparatus control system eliminates all or a part of the detection candidates determined as the bar-shaped object from the mapping image, detects an object, such as an obstacle, based on the mapping image from which the bar-shaped object is eliminated, and then performs brake control, drive assist, or the like. With this configuration, it is possible to perform drive assist control in a preferred manner without being influenced by a bar at an ETC gate, a railroad crossing gate, or the like.

When the mapping image is to be formed, it is preferable to specify a road surface shape from the disparity image, and use only information located above the road surface in a real space. This makes it possible to remove noise in object detection. The road surface may be specified by various well-known methods; for example, it may be possible to use a linear equation of a road model as described in Japanese Unexamined Patent Application Publication No. 2008-65634, which is a document referred to herein. Hereinafter, a height from the road surface may be used for determination in object detection of the present embodiment, and, in this case, information on the road surface specified from the disparity image by the well-known method as described above is used.

Hereinafter, an example will be described in which a bar-shaped object is detected in order to reject the bar-shaped object from an object region detected as a candidate of a control target. However, the disclosed technique is of course applicable to a case in which a bar-shaped object is positively used as a detection target instead of a rejection target.

Exclusion Target Determination Process

A region including an elongated object continuing in the lateral direction is employed as a bar-shaped object detection candidate. The exclusion target determining unit 61 sets, to a region to be employed as a bar-shaped object detection candidate, a flag (information) indicating that the region is the bar-shaped object detection candidate, and sets, to a region that is not to be employed as a bar-shaped object detection candidate, a flag (information) indicating that the region is not the bar-shaped object detection candidate.

However, as illustrated in FIG. 8, a bed portion of a pickup truck running in front of the vehicle 1 is an object continuing in the lateral direction, and therefore may be detected as a detection candidate region including a bar-shaped object. If the bed portion of the pickup truck is detected as a bar-shaped object by error, an inconvenience occurs such that brake control or the like that is supposed to be performed in accordance with a distance from the vehicle 1 to the bed portion of the pickup truck may be performed in accordance with a distance from the vehicle 1 to a driving seat of the pickup truck.

Therefore, when detecting another object just behind a certain object, the exclusion target determining unit 61 sets a flag indicating that the object on the near side (located closer to the vehicle 1) is not employed as the bar-shaped object detection candidate. Specifically, in the case of the pickup truck for example, as illustrated in FIG. 8, a region of a driving seat is detected just behind a region of the bed, separately from the bed. In this case, a flag indicating that the region of the bed is not employed as the bar-shaped object detection candidate is set. With this configuration, it is possible to exclude the bed portion of the pickup truck from the bar-shaped object detection process, and accurately perform brake control or the like in accordance with a distance from the vehicle 1 to the bed portion of the pickup truck.

When it is configured such that a region of a certain object on the near side (located closer to the vehicle 1) is not employed as a region of the bar-shaped object detection candidate when another object is detected just behind the certain object, and if a vehicle is stopped on the far side beyond a bar that stays lowered at a parking gate for example, it is difficult to detect the bar at the parking gate as a bar-shaped object. However, this situation is a situation in which the vehicle 1 collides with the bar at the parking gate and the vehicle stopped on the far side when the vehicle 1 moves forward. Therefore, it is not a problem even if a region of a certain object on the near side (located closer to the vehicle 1) is not employed as the bar-shaped object detection candidate when another object is detected just behind the certain object. In view of the above-described concept, a flow of the exclusion target determination process will be described below.

First, when the above-described mapping image is generated, the exclusion target determining unit 61 illustrated in FIG. 5 detects an object region to be a bar-shaped object detection candidate from the mapping image as indicated by the flowchart illustrated in FIG. 9.

Step S1: The short-distance object detecting unit 71 extracts short-distance objects.

Step S2: The overlap processing unit 72 selects a pair of short-distance objects.

Step S3: The exclusion processing unit 73 rejects overlapping short-distance objects on the far side.

Step S4: It is determined whether a pair of short-distance objects to be determined remains on the mapping image. The process from Step S2 is repeated when a pair of short-distance objects to be determined remains. The process proceeds to Step S5 when a pair of short-distance objects to be determined does not remain.

Step S5: The short-distance object detecting unit 71 selects a short-distance object.

Step S6: The overlap processing unit 72 determines whether another object is present just behind (on the far side of) the short-distance object.

Step S7: When another object is present just behind (on the far side of) the short-distance object, the exclusion processing unit 73 excludes the short-distance object from the bar-shaped object detection candidate.

Step S8: When a short-distance object to be determined remains, the process from Step S5 is repeated. When a short-distance object to be determined does not remain, the elimination target determination process is terminated. The "short-distance object" is an object detected at a shorter distance to the vehicle 1 than a certain threshold, and "another object" is an object detected in addition to the short-distance object.

As a method of detecting the object region from the mapping image, various well-known methods may be used. For example, it may be possible to extract a group of connected pixels by a well-known labeling process, and detect the extracted group of pixels as an object when the group of pixels is greater than a predetermined size. As a detected object region, a frame surrounding the detected object is specified. The frame described herein is information indicating a position and a size of the object, and is, for example, information on the coordinates of the corners of the frame (a rectangle), a height of the frame, and a width of the frame.

While the frame indicating the object is obtained by using the mapping image, which is one example of the disparity information, in the above-described process, the frame may be specified by using luminance information. In this case, various well-known methods may be used.

Specifically, the exclusion target determining unit 61 (the short-distance object detecting unit 71) detects, as a short-distance object, an object that is located within a certain distance (for example, 20 meters) relatively close to the vehicle 1 and that has a height shorter than a certain height (for example, 2 meters). By using the parameters as described above, a region including an object located at a short distance and having a height that is not too high (a region to be the bar-shaped object detection candidate) is extracted from all of objects on the mapping image (Step S1).

Furthermore, the exclusion target determining unit 61 (the overlap processing unit 72) performs the exclusion target determination process of determining whether a region is employed as the bar-shaped object detection candidate by using 50 (%) as a determination threshold for an overlapping rate of the short-distance objects, for example. Moreover, the exclusion target determining unit 61 (the overlap processing unit 72) performs the exclusion target determination process by using 1 meter as a maximum value of a distance difference to be regarded as the same distance as other short-distance objects, for example. Then, the exclusion target determining unit 61 (the exclusion processing unit 73) rejects an object determined as an exclusion target through the exclusion target determination process. That is, the "overlapping rate" of the short-distance objects is used as a reference to detect a short-distance object closest to the vehicle 1, while a short-distance object located away from a certain short-distance object by a constant distance or greater is excluded from the bar-shaped object detection candidate (Step S2 to S4).

This condition is based on the assumption that different objects are detected in an overlapping manner, rather than the assumption that an identical object is doubly detected. The exclusion target determining unit 61 (the overlap processing unit 72) determines that objects, which are overlapping with each other in a captured image and located at a distant position that can hardly be assumed as a position at the same distance, are not short-distance objects located on the nearest side. If an object meets the conditions as described above, the exclusion target determining unit 61 (the exclusion processing unit 73) excludes the object from the short-distance object. In contrast, if an object does not meet the conditions as described above, the exclusion target determining unit 61 (the overlap processing unit 72) proceeds to the exclusion target determination process based on conditions as described below.

If a short-distance object and another object overlap with each other and a distance to the another object located on the far side is shorter than 2 meters for example, the exclusion target determining unit 61 (the overlap processing unit 72) determines a region of the short-distance object as a region to be excluded from the region of the bar-shaped object detection candidate. Furthermore, the exclusion target determining unit 61 (the overlap processing unit 72) performs the exclusion target determination process by using "70 (%)" as a determination threshold for an overlapping rate of the short-distance object and another object. Then, the exclusion target determining unit 61 (the exclusion processing unit 73) rejects an object determined as an exclusion target through the exclusion target determination process. With this configuration, it is possible to exclude a bed portion of a pickup truck or the like from the bar-shaped object detection process.

This condition is based on the assumed relationship between a bed of a pickup truck and a driving seat, for example. The exclusion target determining unit 61 determines that an object, for which another object is located on the far side approximately within a distance between a cabin and a bed of a pickup truck and which overlaps with the another object on the mapping image, is not a bar-shaped object. In this case, the exclusion target determining unit 61 sets, to the region of the object, information (flag) indicating that the bar-shaped object detection process is not performed.

The series of processes performed by the exclusion target determining unit 61 as described above does not necessarily have to be performed. However, in view of improvement of a processing speed, presence of pickup trucks, and prevention of erroneous detection, it is preferable to perform the series of processes.

When calculating the overlapping rate of two objects, the exclusion target determining unit 61 (the overlap processing unit 72) first calculates such that "an overlapping region=min(a right edge of an object A, a right edge of an object B)−max(a left edge of the object A, a left edge of the object B)". Then, the exclusion target determining unit 61 calculates the overlapping rate of the object A by calculating such that "(the overlapping region×100)/a width of the object A", and calculates the overlapping rate of the object B by calculating such that "(the overlapping region×100)/the width of the object B".

The exclusion target determining unit 61 assigns a flag indicating a bar-shaped object detection candidate to an object that is not determined as an exclusion target.

Bar-Shaped Object Detection Process

Next, the bar region detecting unit 62 illustrated in FIG. 5 determines whether a bar-shaped object is included in the region to which the flag indicating a bar-shaped object detection candidate is assigned by the exclusion target determining unit 61. For example, a bar of an electronic toll collection (ETC) system, a railroad crossing gate, or the like is not always detected as a single bar, but may be detected as a single object together with an elevating machine that moves the bar up and down. In this case, the bar region detecting unit 62 detects only a portion corresponding to the bar that is a bar-shaped object.

In the bar-shaped object detection process, a maximum height (top) from a road surface of a local portion and a minimum height (bottom) from the road surface of the local portion as illustrated in FIG. 10 are used as basic feature amounts, in addition to using the disparity information (distance information). The bar region detecting unit 62 also performs a process of determining whether an object is the bar-shaped object by using the presence or absence of a background disparity. The "local portion" is a partial region obtained by dividing, in the lateral direction (width direction) of an image, a frame serving as the bar-shaped object detection candidate (the frame is information indicating a rectangle indicating a position and a size of an object, for example, information on the coordinates of the corners of the rectangle, a height of the rectangle, and a width of the rectangle). The number of divisions is determined experimentally. The "background disparity" is a disparity of an object located in the background of the region serving as the bar-shaped object detection candidate.

As described above, with use of the disparity information, it becomes possible to reliably detect a bar-shaped object even when it is difficult to detect the bar-shaped object by using the luminance information because the bar-shaped object is patterned. Furthermore, with use of the information on a "local portion", it becomes possible to reliably detect a bar-shaped object even when it is difficult to obtain the disparity information in the horizontal direction (a matching process in disparity calculation is generally performed in the horizontal direction, and therefore, it is usually difficult to obtain disparity information on edges in the horizontal direction). Moreover, with use of the information on the "local portion", it becomes easy to detect a bar-shaped object being moved up and down.

The bar region detecting unit 62 detects an object included in a detection candidate region as a bar-shaped object based on the following conditions, in addition to taking into account the background disparity.

1. A difference between the top and the bottom of a detection candidate object is small (a height of the object itself is short, that is, a thickness of the object is thin).
2. A height of the detection candidate object from the road surface is high (for example, a height of the bottom of the object from the road surface is high).
3. Heights of the tops of a plurality of local portions of an object in a detection candidate region are continued (a difference between adjacent portions is small).

Details of Bar-Shaped Object Detection Process

The bar-shaped object detection process performed by the bar region detecting unit 62 will be described in detail below. The bar region detecting unit 62 detects a bar-shaped object through a first local bar region detection process performed by the first local bar region detecting unit 81, a second local bar region detection process performed by the second local bar region detecting unit 82, a banner region detection process performed by the banner region detecting unit 83, and a bar region integration process performed by the bar region specifying unit 84. It is possible to employ not only a simple bar-shaped object but also a bar-shaped object with a banner as a detection target.

First Local Bar Region Detection Process

When a bar-shaped object is to be detected, the bar region detecting unit 62 first causes the first local bar region detecting unit 81 to perform the first local bar region detection process. In the first local bar region detection process, when a background disparity is present in a local portion of an object, when a height (thickness) of the local portion is smaller than a thickness feature amount (a value that is experimentally determined by assuming a limited thickness that is to be detected as a bar-shaped object), and when a height of the local portion from the road surface is equal to or greater than a height feature amount (a value that is experimentally determined by assuming a minimum height from the road surface to the bar-shaped object), the local portion is detected as a local portion of the bar-shaped object.

With reference to FIG. 11 and FIGS. 12A to 12C, a process performed by the bar region detecting unit 62 to detect a background disparity of a region serving as a bar-shaped object detection candidate will be described below. FIG. 11 is a flowchart illustrating an example of a process of selecting an object region to be output. FIG. 12A is a schematic diagram illustrating a region serving as a bar-shaped object detection candidate. First, the bar region detecting unit 62 generates a histogram as illustrated in FIG. 12B (hereinafter, referred to as an "object disparity histogram), which indicates a sum of disparity frequencies in a disparity range corresponding to an object in a region serving as a bar-shaped object detection candidate as illustrated in FIG. 12A (Step S71). The object in this region may be specified by various methods. For example, the object may be specified by a well-known object recognition process, or the most frequent disparity range group in the region may be employed as an object.

Subsequently, the bar region detecting unit 62 generates a histogram as illustrated in FIG. 12C (hereinafter, referred to as a "background disparity histogram"), which indicates a sum of disparity frequencies of disparity points indicating distant positions separated by a predetermined distance or greater relative to a distance (disparity) of the bar-shaped object (Step S72). Subsequently, the bar region detecting unit 62 determines whether a portion, in which a value of the object disparity histogram is equal to or smaller than an object disparity frequency threshold and a value of the background disparity histogram is equal to or greater than a background disparity frequency threshold, is present in the region (Step S73).

When it is determined that such a portion is present (YES at Step S73), the bar region detecting unit 62 determines that a background is present in the range (Step S74), and terminates the process in the flowchart in FIG. 11. In contrast, when it is determined that such a portion is not present (NO at Step S73), the bar region detecting unit 62 determines that a background is not present in the range (Step S75), and terminates the process in the flowchart in FIG. 11. That is, the bar region detecting unit 62 detects the presence or absence of the background based on the degree of inclusion of positions at longer distances than the distance of the bar-shaped object in the region serving as the bar-shaped object detection candidate.

When a difference between the height of the top of the local portion of the object in the region, which serves as the bar-shaped object detection candidate and in which the background is detected, and a height of an adjacent local portion is smaller than a continuation threshold (an experimentally determined value), the first local bar region detecting unit 81 determines that the adjacent local portions are continued. With use of the presence or absence of the background in the bar-shaped object detection process, it becomes easy to separately detect the bar-shaped object and the elevating machine when the bar-shaped object and the elevating machine are detected in an integrated manner, for example. To detect the background disparity, it is more preferable to use two thresholds, such as a first background disparity frequency threshold and a second background disparity frequency that is a half of the first background disparity frequency threshold. With this configuration, when a local bar is once detected with the presence of a background, background detection can be made easier by reducing a threshold used to detect an adjacent local bar that is an adjacent local region in the lateral direction (by switching to the second background disparity frequency threshold that is a half of the first background disparity frequency threshold).

The flow of the first local bar region detection process is illustrated in the flowchart in FIG. 13. The first local bar region detecting unit 81 performs processes from Step S11 to Step S20 as described below.

Step S11: A height from the road surface to the top, a height from the road surface to the bottom, a background disparity frequency, and feature amounts (predetermined values) used for determination are acquired. The "background disparity frequency" is a frequency value of a disparity of an object located in the background of an object serving as the bar-shaped object detection candidate.

Step S12: A threshold for the background disparity frequency is set to an initial value.

Processes from Step S14 to Step S16 and processes from Step S18 to Step S20 are repeated between Step S13 and Step S17. Specifically, while it is determined that the height of the local portion of the object included in a detection candidate is smaller than a maximum height (thickness) to be detected as the bar-shaped object at Step S14, the processes from Step S14 to Step S16 are repeated and a local portion detected as the bar-shaped object is sequentially updated. In other words, the local portion detected as the bar-shaped object is gradually extended (the local portion is gradually increased), and the entire bar-shaped object is detected in the end. If the entire bar-shaped object is detected, the process proceeds from Step S14 to Step S18. Then, a process of returning the threshold for the background disparity frequency to the initial value is performed, and the process control proceeds to a process of detecting a bar-shaped object from a next first local portion.

Step S14: It is determined whether a minimum height of the object from the road surface is higher than a predetermined height feature amount, whether a background disparity frequency is greater than a background disparity frequency threshold, and whether a height (thickness) of the object is smaller than a predetermined thickness feature amount.

Step S15: When it is determined as "YES" at Step S14, the local portion subjected to the first local bar region detection process is shifted (updated) to a next local portion.

Step S16: The background disparity frequency threshold is changed to a half of the initial value.

Step S18: It is determined whether the first local bar region detection process is successively repeated twice on a region that is not a local portion of the object. In the case of "NO", the process returns to Step S14.

Step S19: When it is determined as "YES" at Step S18, the background disparity frequency threshold is returned to the initial value to perform the first local bar region detection process on a region serving as a next detection candidate.

Step S20: The process on the detection candidate on which the first local bar region detection process is currently performed is terminated, and various values are initialized to perform the first local bar region detection process on the next detection candidate.

Figure 14:
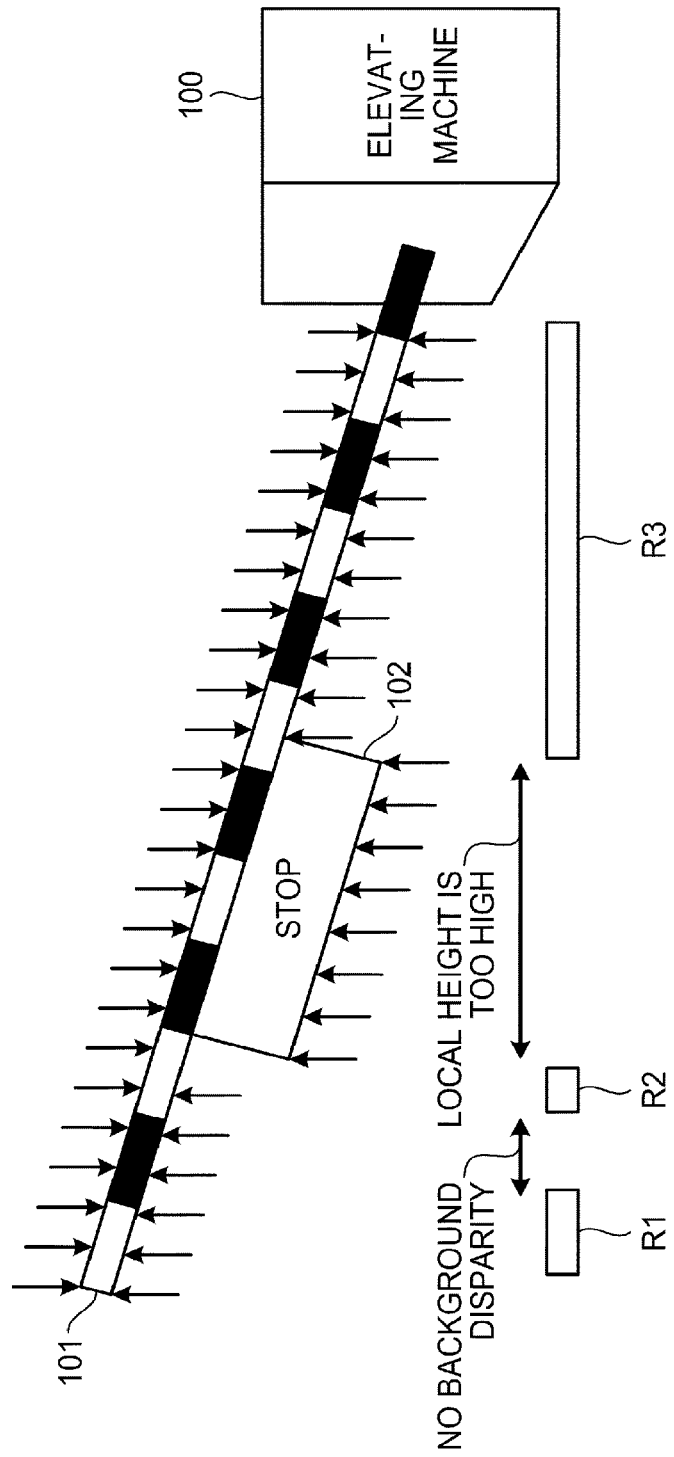
FIG. 14 is a diagram illustrating a detection result of a bar-shaped object in the first local bar region detection process.

FIG. 14 illustrates a detection output of the bar-shaped object obtained through the first local bar region detection process as described above. FIG. 14 illustrates a state in which a bar 101 is lifted up by about 30 degrees by an elevating machine 100 at a parking gate. A banner 102 is provided in the approximate center of the bar 101. In FIG. 14, distances between downward arrows and upward arrows indicate "a width of the bar 101" and "a width of the bar 101 including a width of the banner 102". The width of a portion in which the banner 102 is provided is wider than the width of a portion in which only the bar 101 is provided.

When the bar 101 in the above-described state is detected through the first local bar region detection process, the portion in which the banner 102 is provided is not detected as the bar 101 because the height (thickness) of this portion is equal to or greater than a maximum height (thickness) to be detected as the bar-shaped object. Furthermore, a portion in which a background disparity is not present is not detected as the bar 101. Therefore, while the actual bar 101 is provided in a continuous manner, the bar 101 is intermittently detected as a bar detection output R1, a bar detection output R2, and a bar detection output R3 as illustrated in FIG. 14 in the first local bar region detection process.

As described above, in the first local bar region detection process, a local portion of the bar-shaped object is detected by using background information that is detected by using information on the background disparity, in addition to predetermined feature amounts (the thickness feature amount and the height feature amount); therefore, it is possible to accurately detect the bar-shaped object.

Second Local Bar Region Detection Process

Next, the Bar Region Detecting Unit 62 Causes the Second Local Bar Region Detecting unit 82 to perform the second local bar region detection process. In the first local bar region detection process as described above, the bar-shaped object is detected by taking into account the background disparity. However, in the second local bar region detection process described below, an object, for which a height of a local portion is smaller than a predetermined thickness feature amount (a value that is experimentally determined by assuming a maximum height (thickness) of the bar-shaped object) and a height of the local portion from the road surface is equal to or greater than a height feature amount, is detected regardless of the presence or absence of the background disparity.

In this case, the predetermined feature amounts (the thickness feature amount and the height feature amount) in the second local portion bar detection process are more limited as compared to the feature amounts used in the first local portion bar detection process. That is, a smaller predetermined thickness feature amount and a higher predetermined height feature amount are used. It may be possible to limit only one of the thickness feature amount and the height feature amount.

When a difference between the height of the top of the local portion of the object from the road surface and the height of an adjacent local portion is smaller than a continuation threshold, the second local bar region detecting unit 82 determines that the local portions are continued. With this configuration, it becomes possible to detect a thin bar portion without a banner, such as a bar at an ETC gate or a parking gate. When the bar without the banner is to be detected, it is preferable to perform the second local bar region detection process as described above, without performing the first local bar region detection process as described above.

Figure 15:
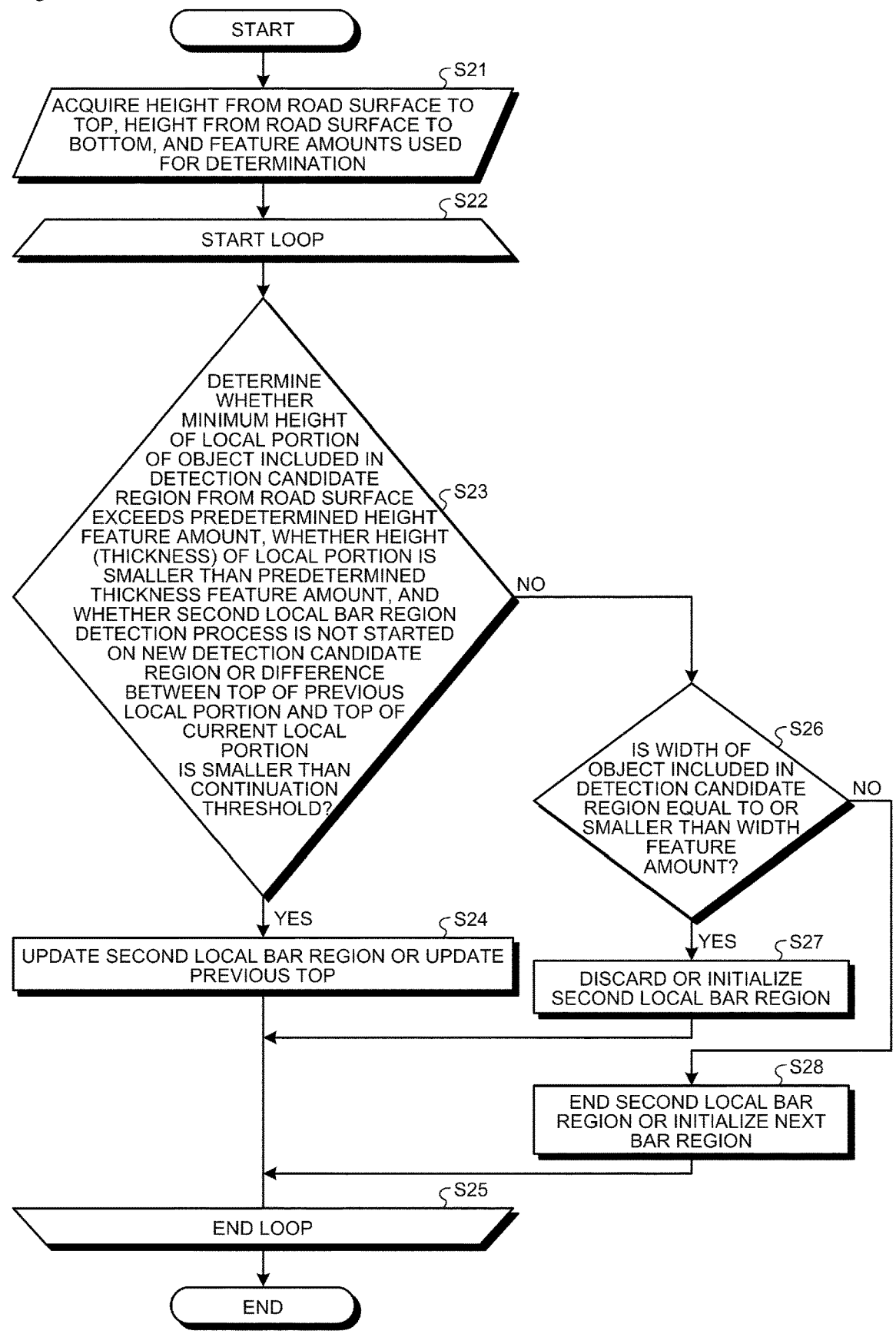
FIG. 15 is a flowchart illustrating the flow of a second local bar region detection process.

FIG. 15 is a flowchart illustrating the flow of the second local bar region detection process. The second local bar region detecting unit 82 performs processes from Step S21 to Step S28 as described below.

Step S21: A height from the road surface to the top, a height from the road surface to the bottom, and feature amounts (predetermined values) used for determination are acquired. After performing the process at Step S21, the second local bar region detecting unit 82 repeats the processes at Step S23, Step S24, and Step S26 to Step S28 between Step S22 and Step S25.

Step S23: It is determined whether a minimum height of the local portion of the object included in a detection candidate region from the road surface exceeds a predetermined height feature amount, whether a height (thickness) of the local portion is smaller than a predetermined thickness feature amount, and whether the second local bar region detection process is not started on a new detection candidate region or a difference between the top of a previous local portion and the top of a current local portion is smaller than the continuation threshold. In the case of "YES", the process proceeds to Step S24. In the case of "NO", the process proceeds to Step S26.

Step S24: A detection candidate region subjected to the second local bar region detection process is updated or the top of the local portion is updated to the top of a next local portion.

Step S26: It is determined whether the width of the object included in the detection candidate region is equal to or smaller than a width feature amount. In the case of "YES", the process proceeds to Step S27. In the case of "NO", the process proceeds to Step S28.

Step S27: The current detection candidate region is discarded or initialized in order to cause the second local bar region detection process to be performed on a next detection candidate region.

Step S28: The second local bar region detection process is terminated or various values are initialized in order to cause the second local bar region detection process to be performed on a next detection candidate region.

Figure 16:
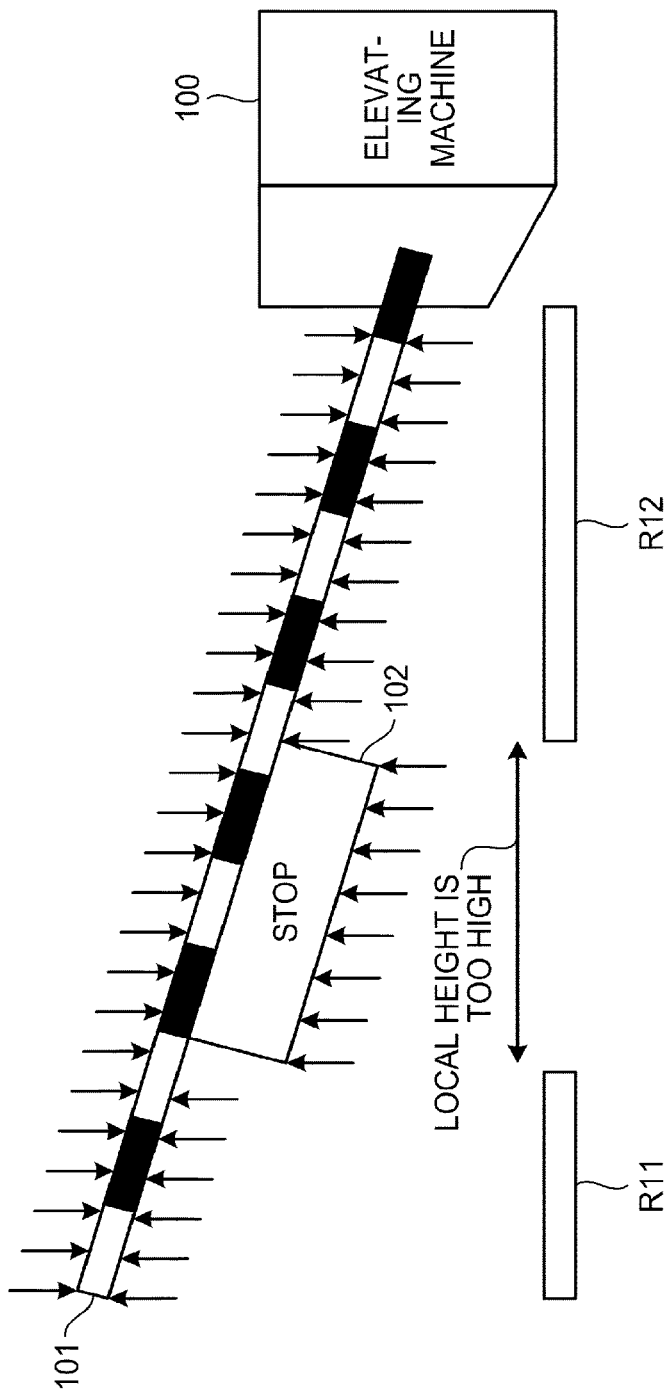
FIG. 16 is a diagram illustrating a detection result of a bar-shaped object in the second local bar region detection process.

FIG. 16 illustrates a detection output of the bar-shaped object obtained through the second local bar region detection process as described above. FIG. 16 illustrates the elevating machine 100, the bar 101, and the banner 102 in the same sate as the state illustrated in FIG. 14. When the bar 101 in this state is detected through the second local bar region detection process, the portion in which the banner 102 is provided is not detected as the bar 101 because the height (thickness) of this portion is equal to or greater than the maximum height (thickness) of the bar-shaped object.

Furthermore, in the second local bar region detection process, the bar-shaped object is detected regardless of the presence or absence of the background disparity. Therefore, in the second local bar region detection process, the bar 101 is detected even in a portion in which the background disparity is present, unlike the first local bar region detection process as described above. Consequently, in the second local bar region detection process, the continuous bar 101 is intermittently detected as a bar detection output R11 and a bar detection output R12, except for the portion in which the banner 102 is provided.

As described above, in the second local bar region detection process, the background information is not used and the feature amounts (the thickness feature amount or the height feature amount) used for the detection are more limited as compared to the feature amounts used in the first local portion bar detection process; therefore, it is possible to accurately detect the bar-shaped object with a simple process.

Banner Region Detection Process

Next, the bar region detecting unit 62 causes the banner region detecting unit 83 to perform the banner region detection process. In the banner region detection process, a bar-shaped object is detected so as to include a banner provided on a bar at a railroad gate or a parking gate. The banner region detecting unit 83 detects, as a bar-shaped object, an object, for which a height (thickness) of the bar-shaped object is smaller than a first thickness feature amount (a value that is experimentally determined by assuming a maximum height (thickness) of the banner from the road surface) and a height of the bottom of the bar-shaped object from the road surface is equal to or greater than a predetermined height feature amount (a value that is experimentally determined by assuming a minimum height of the banner from the road surface).

Furthermore, the banner region detecting unit 83 determines whether the bar is moving upward with regard to the height of the bar from the road surface. When determining that the bar is moving upward, the banner region detecting unit 83 detects, as the bar-shaped object, an object whose height is equal to or greater than the predetermined height feature amount and whose thickness is smaller than a second thickness feature amount.

As a method of determining whether the bar is moving upward, well-known methods may be applied. In the following, determination is performed based on whether the height of a local portion corresponding to the bottom of the object from the road surface is greater than a predetermined elevator threshold.

Furthermore, the banner region detecting unit 83 determines that an object is provided in a continuous manner when a difference between the height of the top of the local portion of the object from the road surface and the height of the top of the adjacent local portion is smaller than a continuation threshold.

The continuation threshold used in the banner region detection process as described above is a value smaller than the continuation thresholds used in the first and the second local bar region detection processes as described above. Therefore, local portions of an object are more likely to be detected in a continuous manner as the local portions of the bar-shaped object in the banner region detection process, as compared to the first and the second local bar region detection processes as described above.

Figure 17:
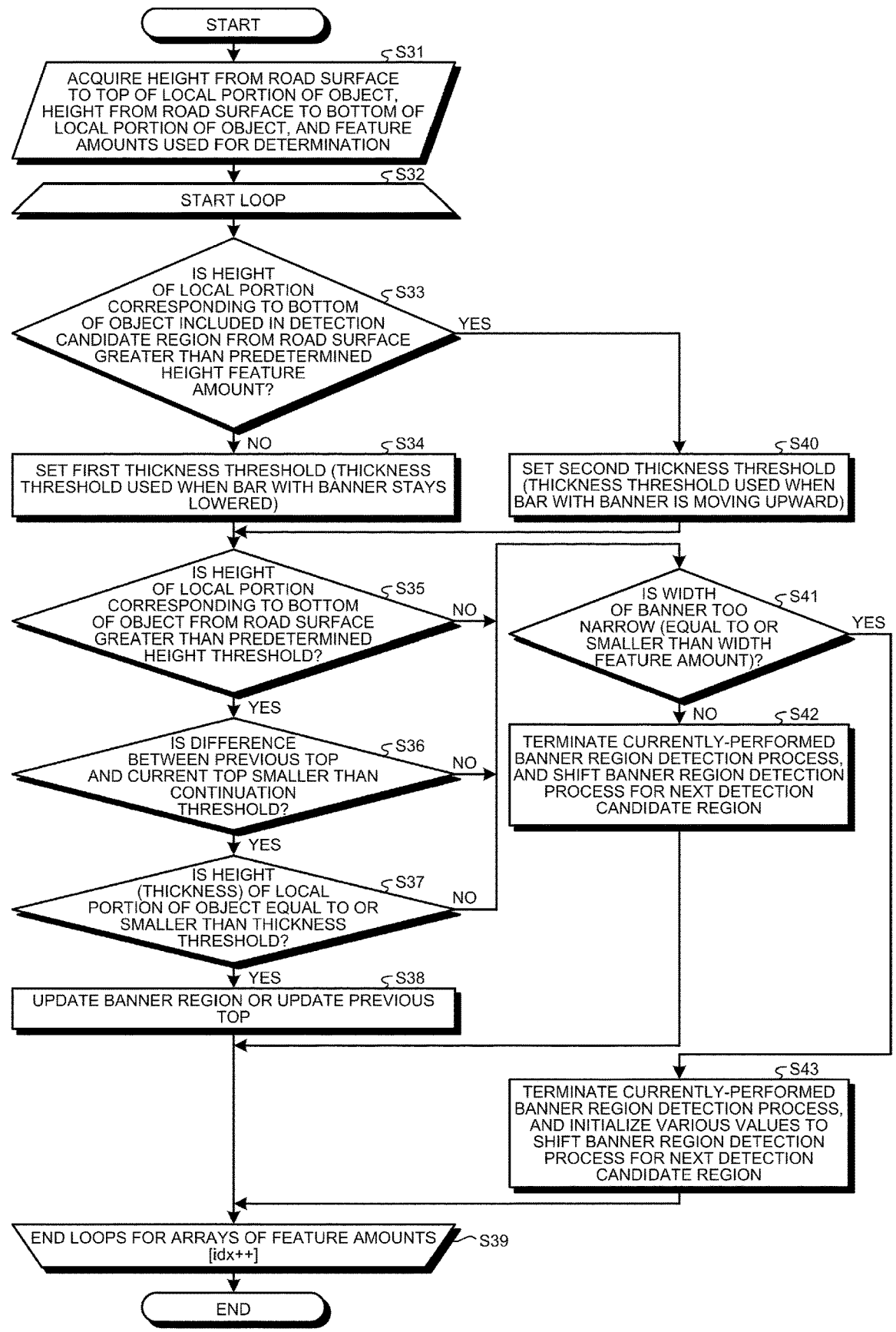
FIG. 17 is a flowchart illustrating the flow of a banner region detection process.

The flow of the banner region detection process is illustrated in the flowchart in FIG. 17. At Step S31, the banner region detecting unit 83 acquires a height from the road surface to the top of the local portion of the object, a height from the road surface to the bottom of the local portion of the object, and feature amounts (predetermined values) used for determination, and repeats processes from Step S33 to Step S43 between Step S32 and Step S39.

Step S33: It is determined whether the height of the local portion corresponding to the bottom of the object included in a detection candidate region from the road surface is greater than the predetermined height feature amount.

Step S34: When it is determined that the height of the local portion corresponding to the bottom of the object from the road surface is smaller than the predetermined elevator threshold (NO at Step S33), a first thickness threshold (a thickness threshold used when the bar with the banner stays lowered) is set.

Step S40: When it is determined that the height of the local portion corresponding to the bottom of the object from the road surface is higher than the predetermined elevator threshold (YES at Step S33), a second thickness threshold (a thickness threshold used when the bar with the banner is moving upward) is set.

Step S35: It is determined whether the height of the local portion corresponding to the bottom of the object from the road surface is greater than the predetermined height threshold.

Step S36: When it is determined that the height of the local portion corresponding to the bottom of the object from the road surface is greater than the predetermined height threshold (YES at Step S35), it is determined whether a difference between the previous top and the current top is smaller than the continuation threshold.

Step S37: It is determined whether the height (thickness) of the local portion of the object is equal to or smaller than the thickness threshold set at Step S34 or Step S40.

Step S38: The banner region detection process is shifted (updated) so as to be performed on a next detection candidate region, or a local portion subjected to the banner region detection process is shifted (updated) from the top of the previous local portion to the top of the next local portion.

Step S41: When it is determined as "NO" at Step S35 to Step S37, it is determined whether the width of the banner is too narrow (equal to or smaller than a width feature amount).

Step S42: When the width of the banner is adequate (when it is determined as "NO" at Step S41), the currently-performed banner region detection process is terminated, and the banner region detection process is shifted so as to be performed on a next detection candidate region.

Step S43: When the width of the banner is too narrow (when it is determined as "YES" at Step S41), the currently-performed banner region detection process is terminated, and various values are initialized in order to cause the banner region detection process to be performed on a next detection candidate region.

Figure 18:
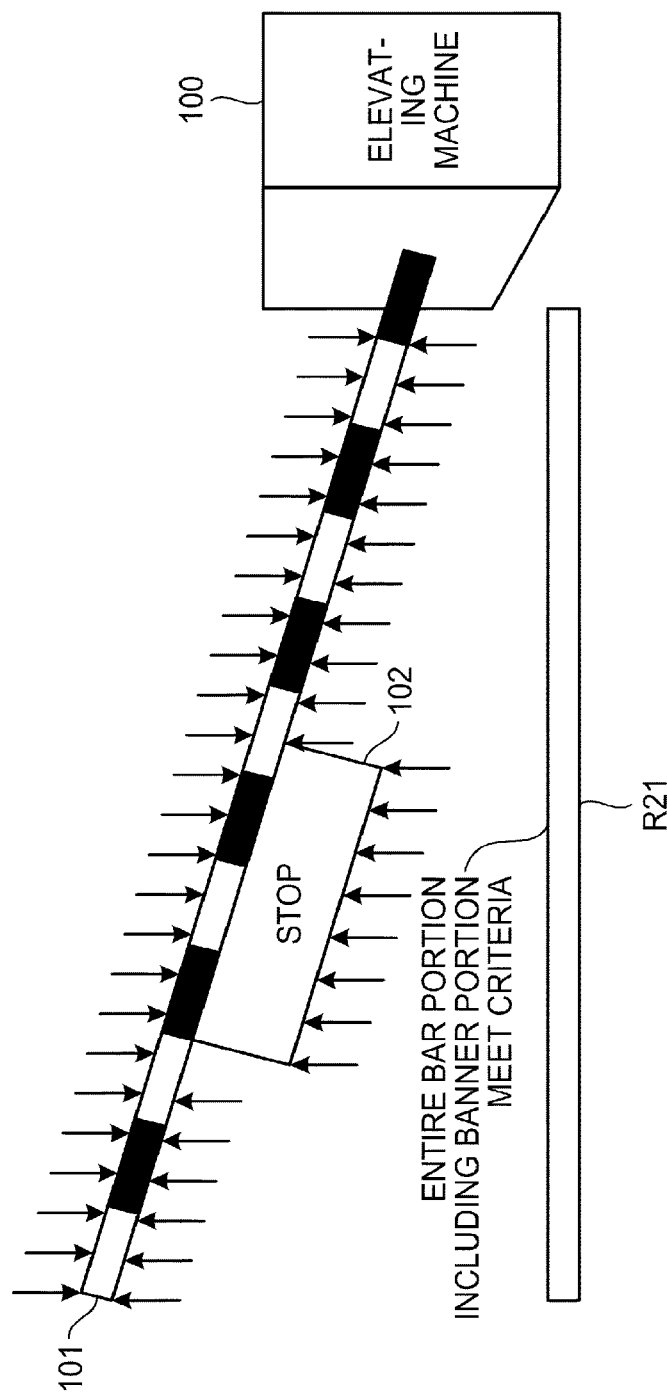
FIG. 18 is a diagram illustrating a detection result of a bar-shaped object in the banner region detection process.

FIG. 18 illustrates a detection output of the bar-shaped object obtained through the banner region detection process as described above. FIG. 18 illustrates the elevating machine 100, the bar 101, and the banner 102 in the same state as the state illustrated in FIG. 14. As described above, the continuation threshold used in the banner region detection process is a value smaller than the thresholds used in the first and the second local bar region detection processes, and the bar-shaped object is more likely to be detected in a continuous manner in the banner region detection process. Therefore, while the portion of the banner 102 is not detected as the bar-shaped object in the first and the second local bar region detection processes, the bar-shaped object is detected so as to include the portion of the banner 102 in the banner region detection process. Consequently, a bar detection output R21 indicating a bar-shaped object continued from a front end portion to a rear end portion, which corresponds to the actual bar 101, is obtained.

As described above, in the banner region detection process, the threshold for the height of the banner is changeable based on whether the bar stays lowered or the bar is moving upward, in addition to taking into account the height of the banner. This is because fluctuation in the height (thickness) of the banner of the local portion is large when the bar is moved up and down. With this configuration, it is possible to accurately detect even the bar-shaped object with the banner.

Bar Detection Output Integration Process

Figure 19:
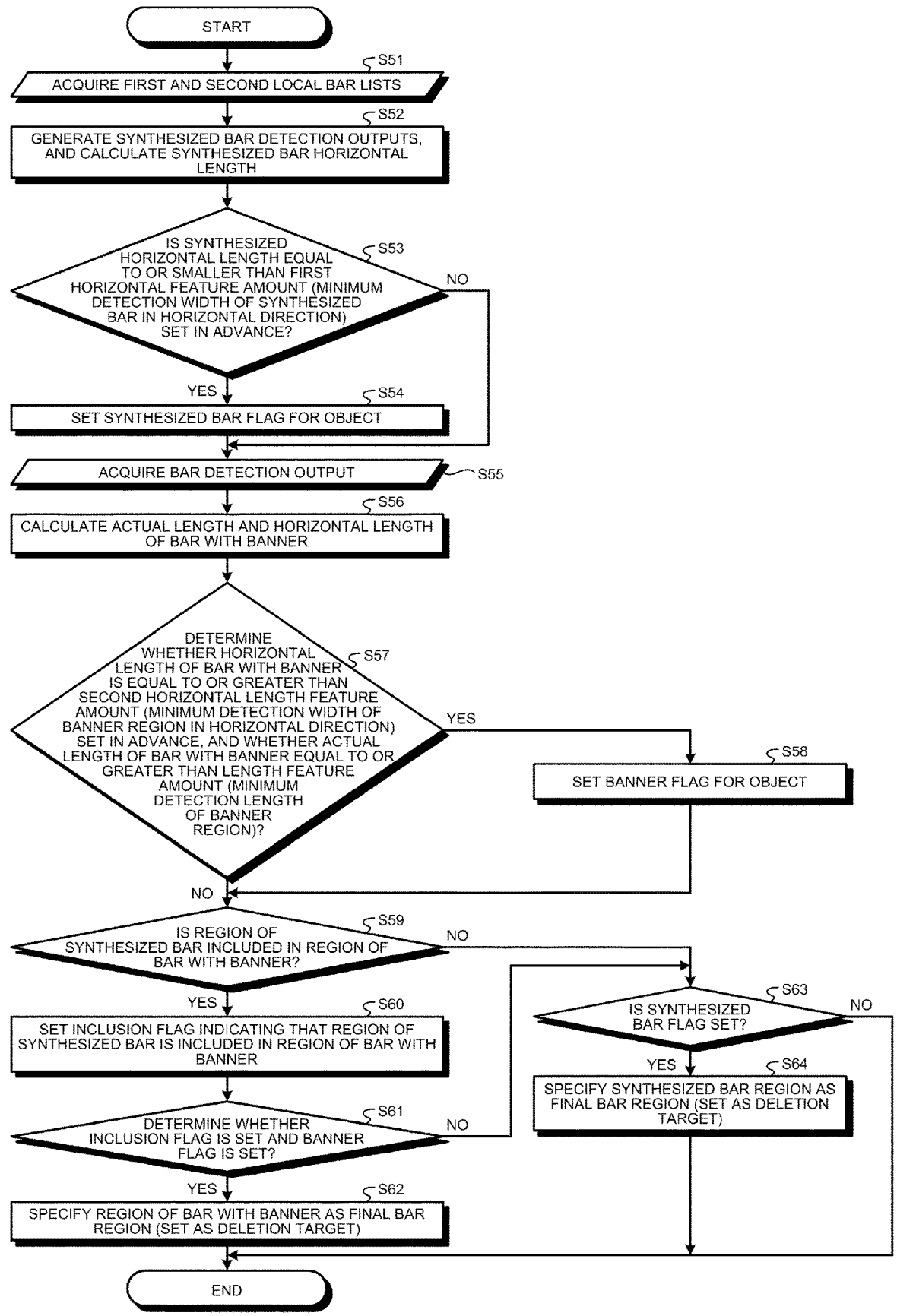
FIG. 19 is a flowchart illustrating the flow of a bar region integration process.

Next, when the first local bar region detecting unit 81 detects the bar detection outputs R1, R2, and R3, when the second local bar region detecting unit 82 detects the bar detection outputs R11 and R12, and when the banner region detecting unit 83 detects the bar detection output R21, the bar region specifying unit 84 performs a process of integrating the detection outputs R1, R2, R3, R11, R12, and R21. A basic concept of the integration process is to integrate the outputs into a bar-shaped object as a final specification target, based on criteria on whether a first bar region and a second bar region are included in a banner region. FIG. 19 is a flowchart illustrating the flow of the bar region integration process performed by the bar region specifying unit 84.

Step S51: The bar detection outputs R1, R2, and R3 detected by the first local bar region detecting unit 81 and the bar detection outputs R11 and R12 detected by the second local bar region detecting unit 82 are acquired.

Step S52: The bar detection outputs R1, R2, R3, R11, and R12 are synthesized (for example, added) to generate synthesized bar detection outputs R31 and R32 (synthesized bar regions), and a synthesized bar horizontal length, which is a length of each of the synthesized bars in the horizontal direction, is calculated.

Step S53: It is determined whether the horizontal length of the synthesized bar are equal to or smaller than a first horizontal length feature amount (a minimum detection width of the synthesized bar in the horizontal direction) set in advance.

Step S54: When the horizontal length of the synthesized bar is equal to or shorter than the first horizontal length feature amount (the minimum detection width of the synthesized bar in the horizontal direction) set in advance (YES at Step S53), a synthesized bar flag is set for the object.

Step S55: The bar detection output R21 detected by the banner region detecting unit 83 is acquired.

Step S56: An actual length and a horizontal length of the bar with the banner are calculated.

Step S57: It is determined whether the horizontal length of the bar with the banner is equal to or greater than a second horizontal length feature amount (a minimum detection width of a banner region in the horizontal direction) set in advance, and whether the actual length of the bar with the banner is equal to or greater than a length feature amount (a minimum detection length of the banner region).

Step S58: When the horizontal length of the bar with the banner is equal to or longer than the second horizontal length feature amount (the minimum detection width of the banner region in the horizontal direction) set in advance, and the actual length of the bar with the banner is equal to or longer than the length feature amount (YES at Step S57), a banner flag is set for the object.

Step S59: It is determined whether a region of the synthesized bar is included in a region of the bar with the banner.

Step S60: An inclusion flag indicating that the region of the bar with the banner includes the region of the synthesized bar is set.

Step S61: It is determined whether the inclusion flag is set and the banner flag is set.

Step S62: In the case of "YES" at Step S61, the region of the bar with the banner is specified as a final bar region (in the present embodiment, set as a deletion target).

Step S63: In the case of "NO" at Step S59 or in the case of "NO" at Step S61, it is determined whether the synthesized bar flag set at Step S54 is still set. If the synthesized bar flag is not set (NO at Step S63), the process is terminated.

Step S64: When the synthesized bar flag is set (YES at Step S63), the synthesized bar region is specified as a final bar region (in the present embodiment, set as a deletion target).

In this manner, integration into the bar region as a final specification target is performed based on whether the first bar region and the second bar region are included in the banner region; therefore, it is possible to more accurately detect the bar-shaped object as compared to a case in which only one of the detection processes is performed. Furthermore, it is possible to prevent erroneous detection and accurately detect the bar-shaped object by additionally using the length of the banner region or the lengths of the first bar region and the second bar region as criteria.

Figure 20:
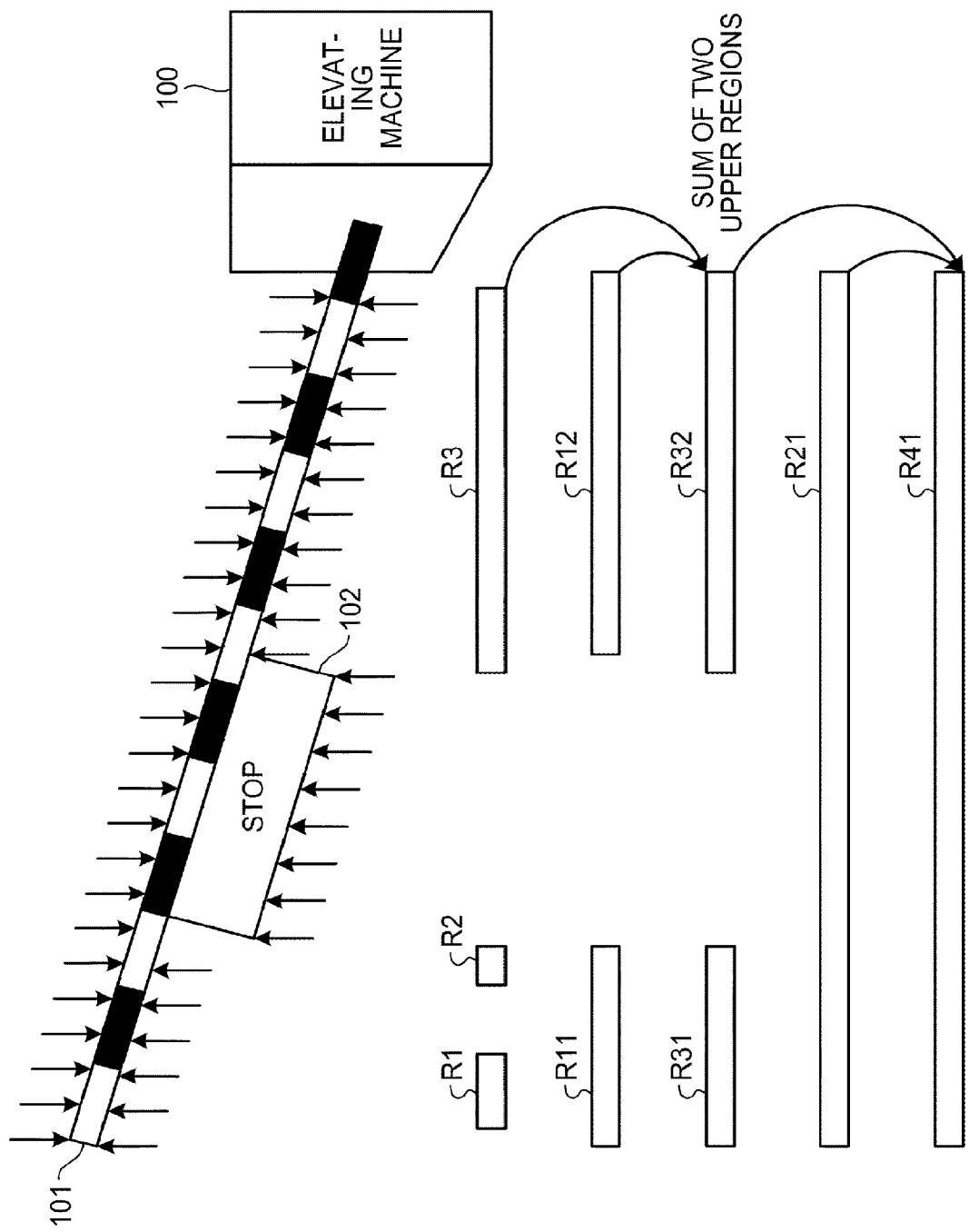
FIG. 20 is a diagram illustrating a detection result of a bar-shaped object in the bar region integration process.

FIG. 20 is a diagram schematically illustrating the bar region integration process performed by the bar region specifying unit 84 as described above. As illustrated in FIG. 20, the bar region specifying unit 84 performs a process of adding the bar detection outputs R1, R2, and R3 detected by the first local bar region detecting unit 81 and the bar detection outputs R11 and R12 detected by the second local bar region detecting unit 82, to thereby generate the synthesized bar detection outputs R31 and R32. Then, when the entire synthesized bar detection outputs R31 and R32 are included in the bar detection output R21 detected in the banner region detection process, the bar region specifying unit 84 determines that the bar detection output R21 detected in the banner region detection process is valid, and output it as a final bar detection output R41.

However, when the bar detection output R21 detected in the banner region detection process includes the synthesized bar detection outputs R31 and R32 (YES at Step S59) and the inclusion flag is set at Step S60, and if the banner flag is set at Step S58 (YES at Step S61), the bar region specifying unit 84 specifies the entire region of the bar detection output R21 detected in the banner region detection process as the bar region R41 (set as a deletion target) (Step S62).

In contrast, when the synthesized bar detection outputs R31 and R32 are not included in the bar detection output R21 detected in the banner region detection process (NO at Step S59) or when the banner flag is not set (NO at Step S61), and if the synthesized bar flag is set (YES at Step S63), the bar region specifying unit 84 specifies the synthesized bar detection outputs R31 and R32 as the bar region R41 (deletion setting) (Step S64).

As described above, in the process of integrating the bar detection outputs, the detection output R21 (detection result) of the banner region detection process is preferentially employed if the detection output R21 is appropriate, and the synthesized bar detection outputs R31 and R32 (detection results) are used if the detection result of the banner region detection process is not appropriate but the detection outputs R31 and R32 are appropriate. In the present embodiment, the detection outputs of the first and the second local portion bar detection processes and the banner region detection process are integrated; however, it is possible to selectively implement any of the detection processes.

Bar Region Elimination Process

Next, the bar region eliminating unit 63 illustrated in FIG. 5 eliminates a bar region determined to be eliminated (set to be deleted) in the bar region corresponding to the final bar detection output R41, from the above-described mapping image. An object that has already been determined to be excluded from bar region elimination is not eliminated from the mapping image.

Figure 21A:
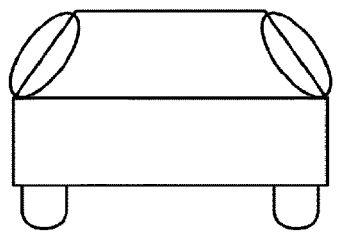
FIG. 21A is a diagram for explaining an operation of determining whether to use an object as a detection target for a bar-shaped object depending on inclination of the object.
Figure 22:
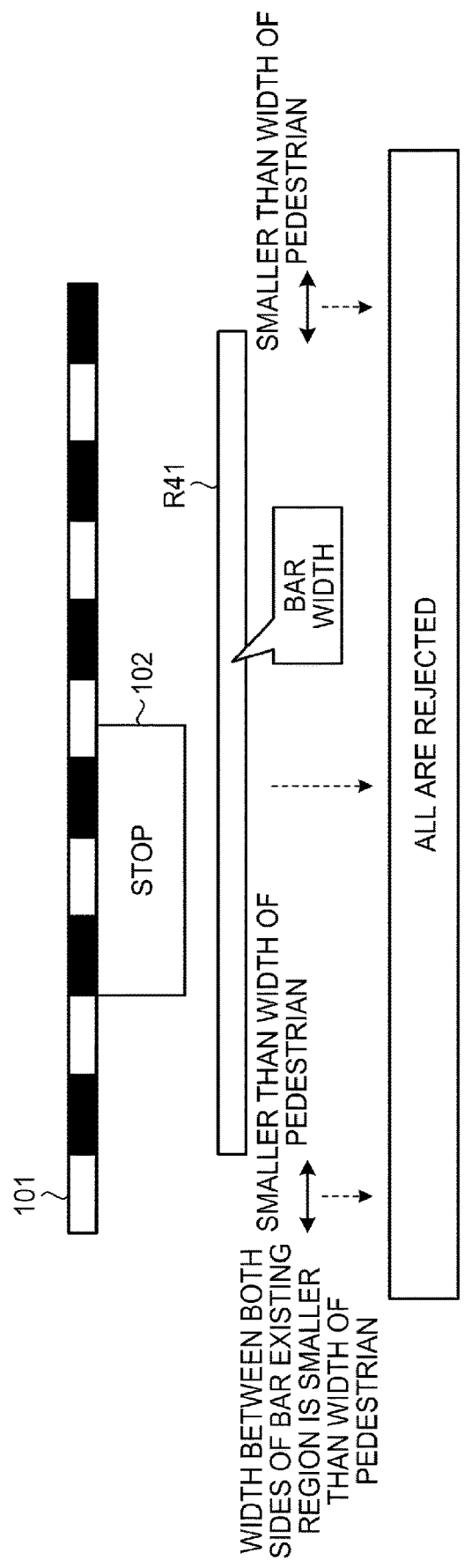
FIG. 22 is a diagram for explaining a process of rejecting, from object detection output, all of objects detected as bar-shaped objects.
Figure 23:
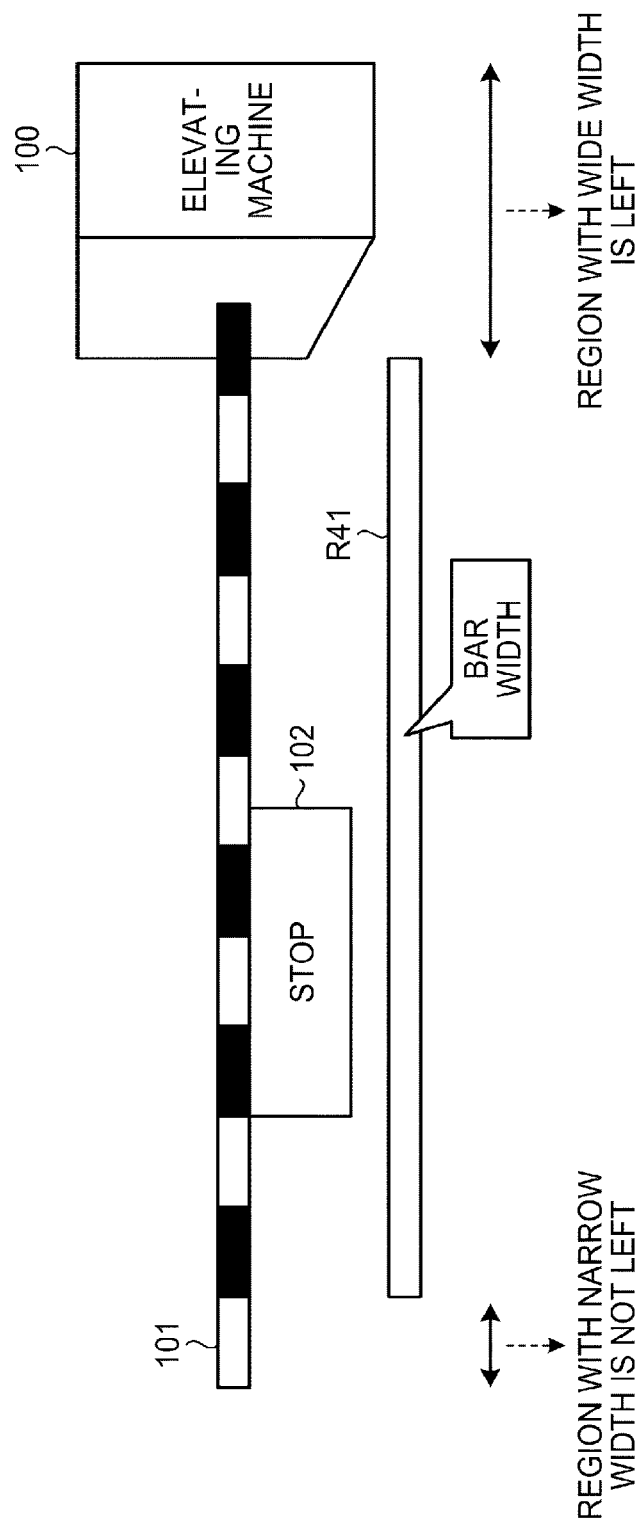
FIG. 23 is a diagram for explaining a process of eliminating, from object detection output, some of objects detected as bar-shaped objects.

First, the bar region eliminating unit 63 causes the inclination determining unit 91 to determine inclination of the bar-shaped object in the bar region corresponding to the final bar detection output R41, and determines whether to eliminate the bar-shaped object from the mapping image. Specifically, a bar of the elevating machine 100 or the like moves upward in the outward direction as illustrated in FIG. 21B. In contrast, pillars of a vehicle or the like are arranged downward in the outward direction from the roof side to the wheel side of the body of the vehicle as illustrated in FIG. 21A. The inclination determining unit 91 performs a bar region elimination determination process based on a difference in the inclination direction of the bar-shaped objects.

For example, if a bar-shaped object is inclined downward by 15 degrees or greater in the outward direction, the elimination determining unit 92 determines that the bar-shaped object is not a bar at a parking gate, a railroad crossing gate, or the like, and determines that the bar-shaped object is not eliminated from the mapping image.

More specifically, when the bar region is located on the left side of a detected rectangle (detected object region) and inclined downward to the left, the bar region indicates, for example, an object such as a pillar on the left side of the vehicle, rather than a bar. In this case, the elimination determining unit 92 determines not to perform bar region elimination.

Similarly, when the bar region is located on the right side of the detected rectangle (detected object region) and inclined downward to the right, the bar region indicates, for example, an object such as a pillar on the right side of the vehicle, rather than a bar. In this case, the elimination determining unit 92 does not perform bar region elimination.

Subsequently, the elimination processing unit 93 of the bar region eliminating unit 63 eliminates the entire bar region from the mapping image or eliminates a part of the bar region from the mapping image, based on the conditions as described above.

The image processing apparatus 30 detects an object, such as a vehicle ahead, a road surface, a pedestrian, or a guardrail, based on the mapping image in which the bar region is eliminated as described above, and provides an object detection result (recognition data illustrated in FIG. 3) to the vehicle ECU 3. The vehicle ECU 3 performs running assist, such as automatic brake control, running lane keep assist, or steering assist, based on the recognition data of the vehicle ahead or the like.

With this configuration, the collision avoidance system can contribute to favorable operations of the collision avoidance system, such as an operation of preventing an alarm sound indicating approach to an object when the vehicle 1 approaches a bar at an ETC gate, a railroad crossing gate, or the like, to thereby prevent a driver from feeling discomfort.

The above-described embodiments are described by way of example, and are not intended to limit the scope of the present invention. Each of the novel embodiments may be embodied in various other forms, and various omissions, replacements, and modifications may be made within the scope not departing from the spirit of the invention. For example, a value of a distance (a distance value) and a disparity value can be handled equivalently. Therefore, while a disparity image is described as one example of a distance image in the above-described embodiments, the present invention is not limited thereto. For example, it may be possible to generate a distance image by integrating distance information generated by using a detection device, such as millimeter-wave radar or laser radar, with respect to a disparity image generated by using a stereo camera. Furthermore, it may be possible to use both of the stereo camera and the detection device, such as millimeter-wave radar or laser radar, and combine detection results with an object detection result obtained by the stereo camera as described above, to thereby further improve the detection accuracy.

The embodiments and the modifications of the embodiments are included in the scope and the spirit of the invention, and are also included in the invention described in the appended claims and in the equivalent range.

REFERENCE SIGNS LIST

1 Vehicle
2 Stereo camera (imaging unit)
2a Camera unit
2b Camera unit
3 Vehicle ECU
4 Imaging apparatus
30 Image processing apparatus
51 Three-dimensional object recognition program
52 Constant parameter
53 Bar region detection parameter
61 Exclusion target determining unit
62 Bar region detecting unit
63 Bar region eliminating unit
71 Short-distance object detecting unit
72 Overlap processing unit
73 Exclusion processing unit
81 First local bar region detecting unit
82 Second local bar region detecting unit
83 Banner region detecting unit
84 Bar region specifying unit
91 Inclination determining unit
92 Elimination determining unit
93 Elimination processing unit

CITATION LIST

Patent Literature

PTL 1: Japanese Unexamined Patent Application Publication No. 2013-228987

The invention claimed is:

1. An information processing apparatus, comprising:
circuitry configured to
   detect an object region based on one of distance information and luminance information;
   detect, in the detected object region, a plurality of local regions that define a divided area, each local region of the plurality of local regions satisfying predetermined conditions, wherein the circuitry is configured to detect an object as one of the local regions by determining at least whether or not a height of an object from a road surface, as measured from a bottom of the object to the road surface, meets a predetermined height condition;
   determine a specification target object by integrating the detected local regions, the specification target object being a single continuous region; and
   output the determined specification target object,
wherein the circuitry is further configured to
   detect one of the local regions when a region located away from an object in the detected object region is present in the divided area,
   detect a first local region of the plurality of local regions when a condition, in which a thickness of an object in the object region is smaller than a first thickness feature amount, and a condition, in which the height of the object from the road surface is greater than a first height feature amount, is satisfied,
   detect a second local region of the plurality of local regions when a condition, in which the thickness of the object in the object region is smaller than a second thickness feature amount that is smaller than the first thickness feature amount, and a condition, in which the height of the object from the road surface is greater than a second height feature amount that is greater than the first height feature amount, is satisfied, and
   determine the specification target object based on the first local region and the second local region.

2. The information processing apparatus according to claim 1, wherein when a thickness of the object in the object region meets a predetermined thickness condition and the height of the object from the road surface meets the predetermined height condition, the circuitry is further configured to detect the object as one of the local regions.

3. The information processing apparatus according to claim 1, wherein the circuitry is further configured to change a condition used to detect the plurality of local regions, depending on a height of each local region from the road surface.

4. The information processing apparatus according to claim 1, wherein the circuitry is further configured to, when detected objects have a front-back
positional relationship and are located within a certain distance indicating that a single object is detected in a partially divided manner, exclude at least the object located on the front side among the objects having the front-back positional relationship from the specification target object.

5. The information processing apparatus according to claim 1, wherein the circuity is further configured to eliminate an object region corresponding to the determined object from each of detected object regions.

6. An imaging apparatus, comprising:
an imaging unit including processing circuitry configured to generate one of distance information and luminance information based on imaging information; and
the information processing apparatus according to claim 1.

7. An apparatus control system, comprising:
the imaging apparatus according to claim 6; and
control circuitry configured to control a predetermined apparatus based on the determined specification target object.

8. A movable object that is controlled by the control circuitry of the apparatus control system according to claim 7.

9. The information processing apparatus of claim 1, wherein the circuitry is further configured to transmit information of the determined specification target object to a vehicle control circuit of a vehicle, to control the vehicle.

10. An information processing method, comprising:
detecting an object region based on one of distance information and luminance information;
detecting, in the detected object region, a plurality of local regions that define a divided area, each local region of the plurality of local regions satisfying predetermined conditions, wherein the detecting step further includes detecting an object as one of the local regions by determining at least whether or not a height of an object from a road surface, as measured from a bottom of the object to the road surface, meets a predetermined height condition;
determining a specification target object by integrating the detected local regions, the specification target object being a single continuous region; and
outputting the determined specification target object,
wherein the information processing method further comprises:
detecting one of the local regions when a region located away from an object in the detected object region is present in the divided area,
detecting a first local region of the plurality of local regions when a condition, in which a thickness of an object in the object region is smaller than a first thickness feature amount, and a condition, in which the height of the object from the road surface is greater than a first height feature amount, is satisfied,
detecting a second local region of the plurality of local regions when a condition, in which the thickness of the object in the object region is smaller than a second thickness feature amount that is smaller than the first thickness feature amount, and a condition, in which the height of the object from the road surface is greater than a second height feature amount that is greater than the first height feature amount, is satisfied, and
determining the specification target object based on the first local region and the second local region.

11. A non-transitory computer-readable recording medium having stored therein a computer program that causes a computer to execute:
detecting an object region based on one of distance information and luminance information;
detecting, in the detected object region, a plurality of local regions that define a divided area, each local region of the plurality of local regions satisfying predetermined conditions, wherein the detecting step further includes detecting an object as one of the local regions by determining at least whether or not a height of an object from a road surface, as measured from a bottom of the object to the road surface, meets a predetermined height condition;
determining a specification target object by integrating the detected local regions, the specification target object being a single continuous region; and
outputting the determined specification target object,
wherein the computer program causes the computer to further execute:
detecting one of the local regions when a region located away from an object in the detected object region is present in the divided area,
detecting a first local region of the plurality of local regions when a condition, in which a thickness of an object in the object region is smaller than a first thickness feature amount, and a condition, in which the height of the object from the road surface is greater than a first height feature amount, is satisfied,
detecting a second local region of the plurality of local regions when a condition, in which the thickness of the object in the object region is smaller than a second thickness feature amount that is smaller than the first thickness feature amount, and a condition, in which the height of the object from the road surface is greater than a second height feature amount that is greater than the first height feature amount, is satisfied, and
determining the specification target object based on the first local region and the second local region.

* * * * *